(12) United States Patent
Tsukada et al.

(10) Patent No.: US 8,927,640 B2
(45) Date of Patent: Jan. 6, 2015

(54) NITRILE COPOLYMER LATEX COMPOSITION AND NITRILE COPOLYMER RUBBER COMPOSITION

(71) Applicant: Zeon Corporation, Tokyo (JP)

(72) Inventors: Akira Tsukada, Tokyo (JP); Kazuhiro Ejiri, Tokyo (JP); Chikara Katano, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 14/105,030

(22) Filed: Dec. 12, 2013

(65) Prior Publication Data

US 2014/0100315 A1  Apr. 10, 2014

Related U.S. Application Data

(62) Division of application No. 12/865,231, filed as application No. PCT/JP2009/051436 on Jan. 29, 2009, now Pat. No. 8,648,137.

(30) Foreign Application Priority Data

| Jan. 30, 2008 | (JP) | 2008-018967 |
| Mar. 17, 2008 | (JP) | 2008-068037 |
| Mar. 28, 2008 | (JP) | 2008-085582 |

(51) Int. Cl.

| C08K 3/34 | (2006.01) |
| C08L 79/04 | (2006.01) |
| B32B 1/08 | (2006.01) |
| B32B 25/08 | (2006.01) |
| C08K 3/00 | (2006.01) |
| C08K 5/11 | (2006.01) |
| C08K 5/5419 | (2006.01) |
| C08L 9/02 | (2006.01) |
| F16L 11/06 | (2006.01) |
| C08K 3/04 | (2006.01) |
| C08L 27/06 | (2006.01) |
| C08L 33/00 | (2006.01) |
| F16L 11/04 | (2006.01) |

(52) U.S. Cl.
CPC . *C08L 79/04* (2013.01); *B32B 1/08* (2013.01); *B32B 25/08* (2013.01); *C08K 3/0033* (2013.01); *C08K 5/11* (2013.01); *C08K 5/5419* (2013.01); *C08L 9/02* (2013.01); *F16L 11/06* (2013.01); *C08K 3/04* (2013.01); *C08L 27/06* (2013.01); *C08L 33/00* (2013.01); *F16L 2011/047* (2013.01)

USPC ........... 524/445; 524/446; 524/447; 524/449; 524/521

(58) Field of Classification Search
USPC ......................... 524/445, 446, 447, 449, 521
See application file for complete search history.

(56) References Cited

U.S. PATENT DOCUMENTS

| 6,333,386 B1 | 12/2001 | Nishiyama et al. |
| 6,498,223 B2 | 12/2002 | Sakata et al. |
| 2010/0104789 A1 | 4/2010 | Imada et al. |

FOREIGN PATENT DOCUMENTS

| JP | 2001-72804 A | 3/2001 |
| JP | 2003-201373 A | 7/2003 |
| JP | 2003-292678 A | 10/2003 |
| JP | 2004-11849 A | 1/2004 |
| JP | 2005-206645 A | 8/2005 |
| JP | 2006-70137 A | 3/2006 |
| JP | 2006-348164 A | 12/2006 |
| JP | 2007-277341 A | 10/2007 |
| WO | WO 2007/026707 A1 | 3/2007 |
| WO | WO 2008/123405 A1 | 10/2008 |

OTHER PUBLICATIONS

International Search Report, dated Apr. 14, 2009, from International Application No. PCT/JP2009/051436.
U.S. Notice of Allowance, dated Sep. 13, 2013, issued in U.S. Appl. No. 12/865,231.
U.S. Office Action, dated Dec. 21, 2012, issued in U.S. Appl. No. 12/865,231.

*Primary Examiner* — Peter D Mulcahy

(74) *Attorney, Agent, or Firm* — Birch, Stewart, Kolasch & Birch, LLP

(57) ABSTRACT

A nitrile copolymer latex composition containing a latex of a nitrile copolymer rubber (A) having α,β-ethylenically unsaturated nitrile monomer units in 10 to 75 wt %, conjugated diene monomer units in 5 to 89.9 wt %, and cationic monomer units and/or monomer units able to form cations in 0.1 to 20 wt %, an inorganic filler (B) having an aspect ratio of 30 to 2,000, and a plasticizer (C) having an SP value by the HOY method of 8 to 10.2 $(cal/cm^3)^{1/2}$, wherein a content of said plasticizer (C) is 0.1 to 200 parts by weight with respect to said nitrile copolymer rubber (A) as 100 parts by weight is provided.

9 Claims, No Drawings ically unsaturated nitrile monomer units in 10 to 75 wt %, conjugated diene monomer units in 5 to 89.9 wt %, and cationic monomer units and/or monomer units able to form cations in 0.1 to 20 wt %, an inorganic filler (B) having an aspect ratio of 30 to 2,000, and a coupling agent (D) in 0.1 to 20 parts by weight with respect to the nitrile copolymer rubber (A) as 100 parts by weight.

NITRILE COPOLYMER LATEX COMPOSITION AND NITRILE COPOLYMER RUBBER COMPOSITION

CROSS-REFERENCE TO RELATED APPLICATIONS

This application is a divisional of U.S. application Ser. No. 12/865,231 filed on Jul. 29, 2010, which is the National Phase of International Application No. PCT/JP2009/051436 filed on Jan. 29, 2009, which claims priority under 35 U.S.C. §119(a) to Japanese Patent Application No. 2008-018967 filed on Jan. 30, 2008, Japanese Patent Application No. 2008-068037 filed on Mar. 17, 2008, and Japanese Patent Application No. 2008-085582 filed on Mar. 28, 2008, all of which are hereby expressly incorporated by reference into the present application.

TECHNICAL FIELD

The present invention relates to a nitrile copolymer rubber composition giving a nitrile copolymer rubber cross-linked product small in gasoline permeability and superior in sour gasoline resistance and cold resistance, a method of production of the rubber composition, and a latex composition giving the rubber composition.

BACKGROUND ART

In the past, rubber containing α,β-ethylenically unsaturated nitrile monomer units and conjugated diene monomer units or olefin monomer units (nitrile copolymer rubber) has been known as rubber superior in oil resistance. Its cross-linked products are being used mainly as materials for fuel hoses, gaskets, packing, and oil seals and other various rubber products mainly used around various oils in automobile applications.

In recent years, due to the growing global movement to protect the environment, efforts are being made to reduce the amount of gasoline and other fuels dissipated in the atmosphere, and much lower gasoline permeability is being sought in fuel hoses, seals, packings, and other applications. Further, for fuel hoses, resistance to the free radicals produced in sour gasoline (sour gasoline resistance) is required.

Under these circumstances, Patent Document 1 proposes to stir and mix various types of rubber latexes, montmorillonite suspensions, and montmorillonite dispersants such as pyrophosphoric acid compounds at a high speed to disperse and mix clayey materials in the rubber latexes to improve the properties of the cross-linked products. However, with the method of Patent Document 1, while the obtained cross-linked product was improved in gas barrier property, the gasoline permeability was insufficient.

Further, Patent Document 2 discloses a method of production of a rubber composition preparing a mixture having a rubber-based polymer and a layered inorganic compound and recovering from the prepared mixture a rubber composition containing the rubber-based polymer and layered inorganic compound. However, the object of Patent Document 2 is to obtain rubber cross-linked product superior in vibration damping property and the gasoline permeability and the sour gasoline resistance were insufficient.

Patent Document 1: Japanese Patent Publication (A) No. 2006-70137
Patent Document 2: Japanese Patent Publication (A) No. 2003-201373

DISCLOSURE OF THE INVENTION

Problem to be Solved by the Invention

The present invention was made in consideration of this situation and has as its object to provide a nitrile copolymer rubber composition giving a nitrile copolymer rubber cross-linked product small in gasoline permeability and superior in sour gasoline resistance and cold resistance and a latex composition giving the rubber composition. Further, the present invention has as its object to provide a method of production of a nitrile copolymer rubber composition giving a nitrile copolymer rubber cross-linked product small in gasoline permeability and superior in sour gasoline resistance and cold resistance.

Means for Solving the Problems

The inventors etc. discovered, first, that the above object can be achieved by a nitrile copolymer latex composition comprised of a latex of a nitrile copolymer rubber having α,β-ethylenically unsaturated nitrile monomer units, conjugated diene monomer units, and cationic monomer units and/or monomer units able to form cations to which an inorganic filler having a predetermined aspect ratio and a plasticizer having a predetermined SP value are added.

Further, the inventors etc. discovered, second, that the above object can be achieved by a nitrile copolymer latex composition comprised of a latex of a nitrile copolymer rubber having α,β-ethylenically unsaturated nitrile monomer units, conjugated diene monomer units, and cationic monomer units and/or monomer units able to form cations to which an inorganic filler having a predetermined aspect ratio and a specific amount of a coupling agent are added.

Furthermore, the inventors etc. discovered, third, that the above object can be achieved by adding to a latex of a nitrile copolymer rubber having a predetermined amount of α,β-ethylenically unsaturated nitrile monomer units an inorganic filler having a predetermined aspect ratio, coagulating the obtained nitrile copolymer latex composition, and thereby producing a nitrile copolymer rubber composition during which using as a coagulating agent a salt containing metal ions whose ionic valency is 1 to 3 and controlling the pH at the time of coagulation to 5.0 or less in range.

Further, the inventors completed the present invention based on these discoveries.

That is, according to the first aspect of the present invention, there is provided a nitrile copolymer latex composition containing a latex of the nitrile copolymer rubber (A) having α,β-ethylenically unsaturated nitrile monomer units in 10 to 75 wt %, conjugated diene monomer units in 5 to 89.9 wt %, and cationic monomer units and/or monomer units able to form cations in 0.1 to 20 wt %, an inorganic filler (B) having an aspect ratio of 30 to 2,000, and a plasticizer (C) having an SP value by the HOY method of 8 to 10.2 $(cal/cm^3)^{1/2}$, wherein a content of the plasticizer (C) is 0.1 to 200 parts by weight with respect to the nitrile copolymer rubber (A) as 100 parts by weight.

In the first aspect of the present invention, the nitrile copolymer rubber (A) preferably has α,β-ethylenically unsaturated nitrile monomer units in 10 to 65 wt %, conjugated diene monomer units in 15 to 89.9 wt %, and cationic monomer units and/or monomer units able to form cations in 0.1 to 20 wt %.

Further, according to the second aspect of the present invention, there is provided a nitrile copolymer latex composition containing a latex of the nitrile copolymer rubber (A)

having α,β-ethylenically unsaturated nitrile monomer units in 10 to 75 wt %, conjugated diene monomer units in 5 to 89.9 wt %, and cationic monomer units and/or monomer units able to form cations in 0.1 to 20 wt %, an inorganic filler (B) having an aspect ratio of 30 to 2,000, and a coupling agent (D), wherein a content of the coupling agent (D) is 0.1 to 20 parts by weight with respect to the nitrile copolymer rubber (A) as 100 parts by weight.

The nitrile copolymer latex composition according to the second aspect of the present invention preferably further contains a plasticizer (C). The plasticizer (C) more preferably has an SP value by the HOY method is 8 to 10.2 $(cal/cm^3)^{1/2}$.

In the first aspect and second aspect of the present invention, preferably the inorganic filler (B) is a smectites.

In the first aspect and second aspect of the present invention, preferably the composition further contains, with respect to the nitrile copolymer rubber (A) as 100 parts by weight, 10 to 150 parts by weight of a vinyl chloride-based resin and/or acryl-based resin.

Furthermore, according to a third aspect of the present invention, there is provided a method of producing a nitrile copolymer rubber composition by coagulation of the nitrile copolymer latex composition of any of the above, wherein the coagulation of said nitrile copolymer latex composition is performed by using a coagulating agent comprised of a salt including metal ions whose ionic valency is 1 to 3 under conditions of pH 5.0 or less.

According to the present invention, there is provided a nitrile copolymer rubber composition obtained by coagulation of the nitrile copolymer latex composition as described in any of the above.

According to the present invention, there is provided a nitrile copolymer rubber composition obtained by the above method.

In the nitrile copolymer rubber composition of the present invention, the composition preferably further contains, with respect to the nitrile copolymer rubber in the nitrile copolymer rubber composition as 100 parts by weight, 10 to 150 parts by weight of a vinyl chloride-based resin and/or acryl-based resin.

According to the present invention, there is provided a cross-linkable nitrile copolymer rubber composition comprised of the above nitrile copolymer rubber composition to which a cross-linking agent is added.

According to the present invention, there is provided rubber cross-linked product obtained by cross-linking the above cross-linkable nitrile copolymer rubber composition.

Further, according to the present invention, there is provided a laminate comprised of two or more layers, wherein at least one layer is comprised of the above rubber cross-linked product.

Furthermore, according to the present invention, there is provided a hose obtained by shaping the above cross-linkable nitrile copolymer rubber composition into a tube, inserting a mandrel, and cross-linking the obtained shaped article. The hose of the present invention is preferably obtained by shaping a laminate of two or more layers including a layer comprised of the above cross-linkable nitrile copolymer rubber composition, into a tube shape, inserting a mandrel, and cross-linking the obtained shaped article.

Effects of the Invention

According to the present invention, there is provided a nitrile copolymer rubber composition giving a nitrile copolymer rubber cross-linked product small in gasoline permeability and superior in sour gasoline resistance and the cold resistance and a latex composition giving the rubber composition.

BEST MODE FOR CARRYING OUT THE INVENTION

First Embodiment

The nitrile copolymer latex composition of the first embodiment of the present invention (the first aspect of the present invention) is a latex composition of nitrile copolymer rubber containing a latex of the nitrile copolymer rubber (A) having α,β-ethylenically unsaturated nitrile monomer units in 10 to 75 wt %, conjugated diene monomer units in 5 to 89.9 wt %, and cationic monomer units and/or monomer units able to form cations in 0.1 to 20 wt %, an inorganic filler (B) having an aspect ratio of 30 to 2,000, and a plasticizer (C) having an SP value by the HOY method of 8 to 10.2 $(cal/cm^3)^{1/2}$, the content of the plasticizer (C) being 0.1 to 200 parts by weight with respect to the nitrile copolymer rubber (A) as 100 parts by weight.

Nitrile Copolymer Rubber (A)

First, the nitrile copolymer rubber (A) forming the latex of the nitrile copolymer rubber (A) used in the first embodiment will be explained.

The nitrile copolymer rubber (A) used in the first embodiment has α,β-ethylenically unsaturated nitrile monomer units in 10 to 75 wt %, conjugated diene monomer units in 5 to 89.9 wt %, and cationic monomer units and/or monomer units able to form cations in 0.1 to 20 wt %.

The ratio of content of the α,β-ethylenically unsaturated nitrile monomer unit is, with respect to all monomer units, 10 to 75 wt %, preferably 10 to 65 wt %, more preferably 15 to 62.5 wt %, furthermore preferably 20 to 60 wt %, particularly preferably 30 wt % or more and less than 55 wt %. If the ratio of content of the α,β-ethylenically unsaturated nitrile monomer units is too low, the obtained rubber cross-linked product deteriorates in oil resistance and the gasoline permeability becomes greater. On the other hand, if the ratio of content is too high, the obtained rubber cross-linked product becomes inferior in cold resistance and the embrittlement temperature becomes higher.

The α,β-ethylenically unsaturated nitrile monomer forming the α,β-ethylenically unsaturated nitrile monomer units is not particularly limited so long as an α,β-ethylenically unsaturated compound having nitrile groups. For example, acrylonitrile; α-chloroacrylonitrile, α-bromoacrylonitrile, and other α-halogenoacrylonitriles; methacrylonitrile and other α-alkyl acrylonitriles; etc. may be mentioned. Among these, acrylonitrile and methacrylonitrile are preferable. These may be used alone or in combinations of a plurality of types.

The ratio of content of the conjugated diene monomer units is, with respect to all monomer units, 5 to 89.9 wt %, preferably 15 to 89.9 wt %, more preferably 22.5 to 84.7 wt %, furthermore preferably 30 to 79.5 wt %, particularly preferably 35 to 69.5 wt %. If the ratio of content of the conjugated diene monomer units is too low, the obtained rubber cross-linked product is liable to fall in rubber elasticity. On the other hand, if the ratio of content is too high, the obtained rubber cross-linked product may become impaired in heat aging resistance or chemical stability.

As the conjugated diene monomers forming the conjugated diene monomer units, C4 or higher conjugated dienes are preferable. For example, 1,3-butadiene, isoprene, 2,3-dimethyl-1,3-butadiene, 1,3-pentadiene, etc. may be mentioned. Among these, 1,3-butadiene is preferable. These may be used alone or in combinations of a plurality of types.

The ratio of content of the cationic monomer units and/or monomer units able to form cations is, with respect to all monomer units, 0.1 to 20 wt %, preferably 0.3 to 15 wt %, more preferably 0.5 to 10 wt %. If the ratio of content of the cationic monomer units and/or the monomer units able to form the cations is too low, the obtained rubber cross-linked product becomes larger in gasoline permeability. On the other hand, if the ratio of content is too high, the obtained rubber cross-linked product ends up deteriorating in cold resistance.

The monomers forming the cationic monomer units and/or monomer units able to form cations may be any monomer forming monomer units charged to a plus state when the obtained polymer contacts water or an acid aqueous solution and are not particularly limited. As such monomers, for example, as cationic monomers, monomers containing quaternary ammonium salt group may be mentioned. Further, as monomers able to form cations, monomers having precursor parts (substituent groups) such as tertiary amino groups cationated and forming ammonium salts (for example, amine hydrochloride or amine sulfate) when contacting acid aqueous solutions of hydrochloric acid, sulfuric acid, etc. may be mentioned.

As specific examples of the cationic monomers, (meth)acryloyloxytrimethyl ammonium chloride (meaning acryloyloxytrimethyl ammonium chloride and/or methacryloyloxytrimethyl ammonium chloride, same below), (meth)acryloyloxyhydroxypropyltrimethyl ammonium chloride, (meth)acryloyloxytriethyl ammonium chloride, (meth)acryloyloxydimethyl benzyl ammonium chloride, (meth)acryloyloxytrimethyl ammonium methylsulfate, and other (meth)acrylic acid ester monomers having quaternary ammonium salt group; (meth)acrylamidepropyltrimethyl ammonium chloride, (meth)acrylamidepropyldimethyl benzyl ammonium chloride, and other (meth)acrylamide monomers having quaternary ammonium salt group; etc. may be mentioned.

As specific examples of the monomers able to form cations, 2-vinyl pyridine, 4-vinyl pyridine, and other vinyl-group containing cyclic amine monomers; dimethylaminoethyl(meth)acrylate, and other tertiary amino-group containing (meth)acrylic acid ester monomers; (meth)acrylamide dimethyl aminoethyl, N,N-dimethyl aminopropylacrylamide, and other tertiary amino-group containing (meth)acrylamide monomers; N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, etc. may be mentioned.

Among these cationic monomers and monomers able to form cations, due to the effects of the present invention becoming much more remarkable, a vinyl-group containing cyclic amine monomer, tertiary amino-group containing (meth)acrylic acid ester monomer, and tertiary amino-group containing (meth)acrylamide monomer are preferable, while a vinyl-group containing cyclic amine monomer and tertiary amino-group containing (meth)acrylamide monomer are particularly preferable. These may be used alone or in combinations of a plurality of types.

Further, the nitrile copolymer rubber (A) used in the first embodiment may contain, in addition to the above α,β-ethylenically unsaturated nitrile monomer units, conjugated diene monomer units, and cationic monomer units and/or monomer units able to form cations, units of other monomers able to copolymerize with monomers forming these monomer units. The ratio of content of the other monomer units is, with respect to all monomer units, preferably 30 wt % or less, more preferably 20 wt % or less, particularly preferably 10 wt % or less.

As the other copolymerizable monomers, for example, styrene, α-methylstyrene, vinyl toluene, and other aromatic vinyl compounds; fluoroethylvinyl ether, fluoropropylvinyl ether, o-trifluoromethylstyrene, vinyl pentafluorobenzoate, difluoroethylene, tetrafluoroethylene, and other fluorine-containing vinyl compounds; 1,4-pentadiene, 1,4-hexadiene, vinyl norbornene, dicyclopentadiene, and other unconjugated diene compounds; ethylene, propylene, 1-butene, 4-methyl-1-pentene, 1-hexene, 1-octene, and other α-olefin compounds; acrylic acid, methacrylic acid, maleic acid, maleic anhydride, itaconic acid, itaconic anhydride, fumaric acid, fumaric anhydride, and other α,β-ethylenically unsaturated carboxylic acids and their anhydrides; methyl(meth)acrylate, ethyl(meth)acrylate, butyl(meth)acrylate, 2-ethylhexyl(meth)acrylate, and other α,β-ethylenically unsaturated carboxylic acid alkyl esters; monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, dibutyl itaconate, and other monoesters and diesters of α,β-ethylenically unsaturated polyvalent carboxylic acids; methoxyethyl(meth)acrylate, methoxypropyl(meth)acrylate, butoxyethyl(meth)acrylate, and other alkoxyalkyl esters of α,β-ethylenically unsaturated carboxylic acids; 2-hydroxyethyl(meth)acrylate, 3-hydroxypropyl(meth)acrylate, and other hydroxyalkyl esters of α,β-ethylenically unsaturated carboxylic acids; divinyl benzene, and other divinyl compounds; ethylene di(meth)acrylate, diethyleneglycol di(meth)acrylate, ethyleneglycol di(meth)acrylate, and other di(meth)acrylic acid esters; trimethylolpropane tri(meth)acrylate, and other trimethacrylic acid esters; and other multifunctional ethylenically unsaturated monomers, and also N-methylol(meth)acrylamide, N,N'-dimethylol(meth)acrylamide, and other self-cross-linkable compounds; etc. may be mentioned.

The Mooney viscosity of the nitrile copolymer rubber (A) (below, sometimes referred to as the "polymer Mooney viscosity") ($ML_{1+4}$, 100° C.) is preferably 3 to 250, more preferably 5 to 225, particularly preferably 10 to 200. If the nitrile copolymer rubber (A) is too low in polymer Mooney viscosity, the obtained rubber cross-linked product is liable to fall in strength properties. On the other hand, if too high, the workability in the case of making it into a nitrile copolymer rubber composition may fall.

Method of Preparation of Latex of Nitrile Copolymer Rubber (A)

The method of production of the latex of the nitrile copolymer rubber (A) used in the first embodiment is not particularly limited. It may be any method enabling copolymerization of the monomers forming the above nitrile copolymer rubber (A). For example, the emulsion polymerization method using sodium dodecyl benzene sulfonate or another emulsifier to obtain a latex of a copolymer having an approximately 50 to 1,000 nm average particle size, the suspension polymerization method (including the microsuspension polymerization method) using polyvinyl alcohol or another dispersant to obtain a latex of a copolymer having an approximately 0.2 to 200 μm average particle size, etc. may be suitably used. Among these, since control of the polymerization reaction is easy, the emulsion polymerization method is more preferable.

The emulsion polymerization method is preferably performed by the following routine.

Note that, below, suitably, the α,β-ethylenically unsaturated nitrile monomer will be referred to as the "monomer (m1)", the conjugated diene monomer as the "monomer (m2)", and the cationic monomer and/or monomer units able to form cations as the "monomer (m3)".

That is, the method of polymerizing 100 parts by weight of a monomer mixture comprised of the monomer (m1) in 10 parts by weight or more, preferably 15 parts by weight or more, more preferably 20 parts by weight or more, and 75 parts by weight or less, preferably 70 parts by weight or less, more preferably 65 parts by weight or less, the monomer (m2) in 5 parts by weight or more, preferably 15 parts by weight or more, more preferably 25 parts by weight or more, and 89.9 parts by weight or less, preferably 84.7 parts by weight or less, more preferably 79.5 parts by weight or less, and the monomer (m3) in 0.1 part by weight or more, preferably 0.3 part by weight or more, more preferably 0.5 part by weight or more, and 20 parts by weight or less, preferably 15 parts by weight or less, more preferably 10 parts by weight or less (where the total amount of monomer (m1), monomer (m2), and monomer (m3) is 100 parts by weight) by emulsion polymerization, stopping the polymerization reaction at the point of time when the polymer conversion rate is preferably 50 to 95 wt %, then as desired removing the unreacted monomers is preferable.

If the amount of use of the monomer (m1) used for the emulsion polymerization method is too small, the obtained rubber cross-linked product deteriorates in oil resistance and becomes larger in gasoline permeability, while if too large, the cold resistance is liable to deteriorate. If the amount of use of the monomer (m2) is too small, the reaction loses activity at the initial stage of polymerization. On the other hand, if too large, the obtained rubber cross-linked product is liable to become larger in gasoline permeability. Further, if the amount of use of the monomer (m3) is too small, when adding the inorganic filler (B), the dispersibility of the inorganic filler (B) deteriorates and the gasoline permeability is liable to become greater. On the other hand, if too large, the cold resistance is liable to deteriorate.

Further, if the polymer conversion rate for stopping the polymerization reaction is too low, recovery of the unreacted monomers will become extremely difficult. On the other hand, if too high, the obtained rubber cross-linked product deteriorates in normal physical properties.

Note that, when performing emulsion polymerization, it is possible to suitably use an emulsifier, polymerization initiator, secondary material for polymerization, etc. known in the past in the field of emulsion polymerization. The polymerization temperature and the polymerization time may also be suitably adjusted.

In the first embodiment, the entire amounts of the monomers (m1) to (m3) used for the emulsion polymerization may be used to start the polymerization reaction, but from the viewpoint of controlling the distribution of composition of the monomer units of the copolymer formed and obtaining rubber cross-linked product richer in rubber elasticity, preferably parts of the total amounts of the monomers (m1) to (m3) used for the emulsion polymerization are used to start the polymerization reaction, then the remains of the monomers (m1) to (m3) used for the emulsion polymerization are added to the reactor for polymerization. This is because, in general, if ending up reacting the total amounts of the monomers (m1) to (m3) used for the emulsion polymerization from the time of start of the polymerization reaction, the distribution of composition of the obtain copolymer will become broader.

In this case, a monomer mixture of the monomer (m1) used for the polymerization in preferably 10 to 100 wt %, more preferably 20 to 100 wt %, particularly preferably 30 to 100 wt %, the monomer (m2) used for the polymerization in preferably 5 wt % or more, more preferably 10 wt % or more, particularly preferably 15 wt % or more and preferably 90 wt % or less, more preferably 80 wt % or less, particularly preferably 70 wt % or less, and the monomer (m3) used for the polymerization in preferably 0 to 100 wt %, more preferably 30 to 100 wt %, particularly preferably 70 to 100 wt % is preferably charged into the reactor to start the polymerization reaction, then remaining monomers is added to the reactor to continue the polymerization reaction so that the polymer conversion rate with respect to the monomer mixture charged in the reactor is preferably 5 to 80 wt % in range.

The method of adding the remaining monomers is not particularly limited. They may be added all together or may be added in batches. Further, they may be added continuously. In the first embodiment, from the viewpoint of the ability to more simply control the obtained copolymer in distribution of composition, the remaining monomers is preferably added in batches. Addition in one to six batches is particularly preferable. If adding the remaining monomers in batches, the amounts of monomers added in batches and the timings of addition of the batches may be adjusted in accordance with the progress in the polymerization reaction so as to obtain the desired copolymer.

Further, afterward, as desired, heat distillation, vacuum distillation, steam distillation, or another known method is used to remove the unreacted monomers and thereby obtain the latex of the nitrile copolymer rubber (A).

In the first embodiment, the latex of the nitrile copolymer rubber (A) obtained by the emulsion polymerization method has a solid content concentration of preferably 5 to 70 wt %, more preferably 10 to 60 wt %. The latex of the nitrile copolymer rubber (A) has a pH of the isoelectric point of preferably 1 to 5, more preferably 1 to 4.5, particularly preferably 1 to 4.

Note that, the nitrile copolymer rubber (A) may also be obtained by hydrogenation of the unsaturated bond parts in the diene monomer units of the copolymer obtained by copolymerization in the above way (hydrogenation reaction). The method of hydrogenation is not particularly limited. Any known method may be employed.

Nitrile Copolymer Latex Composition

The nitrile copolymer latex composition of the first embodiment contains the above latex of the nitrile copolymer rubber (A), the inorganic filler (B) having an aspect ratio of 30 to 2,000, and the plasticizer (C) having an SP value by the HOY method of 8 to 10.2 $(cal/cm^3)^{1/2}$, the content of the plasticizer (C) being 0.1 to 200 parts by weight in range with respect to the nitrile copolymer rubber (A) as 100 parts by weight. Note that, from the viewpoint of the ability of the various properties to be improved, the nitrile copolymer latex composition of the first embodiment is preferably comprised of the latex of the nitrile copolymer rubber (A) and the inorganic filler (B) uniformly mixed and dispersed. Note that, as the method of uniformly dispersing these, the method of adding to the latex of the nitrile copolymer rubber (A) an aqueous dispersion of the inorganic filler (B) and an aqueous dispersion of the plasticizer (C) having an SP value by the HOY method of 8 to 10.2 $(cal/cm^3)^{1/2}$ under stirring may be mentioned.

The inorganic filler (B) used in the first embodiment has an aspect ratio of 30 to 2,000, preferably 35 to 1,800, more preferably 40 to 1,600. By using such a flat shaped inorganic filler, the obtained cross-linked product may be given the effect of blocking permeation of the gasoline. Furthermore, among flat shaped inorganic fillers, by using an inorganic filler having an aspect ratio in the above range and combining this with the above nitrile copolymer rubber (A), the obtained cross-linked product can be made one excellent in gasoline permeability and sour gasoline resistance and superior in cold resistance. If the aspect ratio is too small, the obtained cross-linked product ends up falling in the gasoline permeability resistance. On the other hand, if too large, the dispersion into the latex of the nitrile copolymer rubber (A) becomes difficult and the mechanical strength ends up falling.

Note that, in the first embodiment, the "aspect ratio" of the inorganic filler (B) is the ratio of the planar average diameter and the average thickness of the inorganic filler (B). Here, the planar average diameter and average thickness are the number average values calculated by measuring the planar direction diameters and thicknesses of randomly selected 100 particles of the inorganic filler (B) by an atomic force microscope and finding their arithmetic average values.

The inorganic filler having an aspect ratio of 30 to 2,000 is not particularly limited. It may be one derived from a natural material or one obtained by refining or other treating a natural material or may be a synthetic one. As specific examples, kaolinite, halloysite, and other kaolinites; montmorillonite, beidellite, nontronite, saponite, hectorite, stevensite, mica, and other smectites; vermiculites; chlorite; talc, etc. may be mentioned. Among these, smectites are preferable, montmorillonite, mica, and saponite are particularly preferable. These may be used alone or in combinations of a plurality of types. In particular, in the first embodiment, it is preferable to treat montmorillonite, mica, and saponite by water dispersion to separate the layers forming montmorillonite, mica, and saponite as the multilayer structure compounds for use. By such water dispersion treatment, it is possible to obtain a composition with a better dispersibility.

Further, montmorillonite, mica, and saponite are multilayer structures having exchangeable positive ions between the layers, so are superior in dispersibility in the cationic monomer units and/or monomer units able to form cations in the above nitrile copolymer rubber (A) and may be suitably used. In particular, by improving the dispersibility of the nitrile copolymer rubber (A) and inorganic filler (B), it is possible to reduce the gasoline permeability more and, further, lower the embrittlement temperature more. Note that, the ratio of the inorganic filler (B) and the cationic monomer units and/or monomer units able to form cations is preferably, by weight ratio, "inorganic filler (B): cationic monomer units and/or monomer units able to form cations"=1:0.0005 to 1:20, more preferably 1:0.003 to 1:5. If the ratio is outside the above range, the dispersibility of the nitrile copolymer rubber (A) and the inorganic filler (B) ends up falling and the above effects sometimes become difficult to obtain.

Further, the average particle size of the inorganic filler (B) is preferably 0.001 to 20 µm, more preferably 0.005 to 15 µm, particularly preferably 0.01 to 10 µm. In the first embodiment, the average particle size of the inorganic filler (B) is defined by the 50% volume cumulative diameter found by measuring the particle size distribution by the X-ray transmission method. If the particle size of the inorganic filler (B) is too small, the obtained rubber cross-linked product is liable to fall in elongation. Conversely, if too large, there is a possibility that a stable latex composition cannot be prepared.

The content of the inorganic filler (B) is, with respect to the nitrile copolymer rubber (A) as 100 parts by weight, preferably 1 to 200 parts by weight, more preferably 2 to 150 parts by weight, particularly preferably 3 to 120 parts by weight. If the amount of use of the inorganic filler (B) is too small, the obtained rubber cross-linked product is liable to deteriorate in gasoline permeability resistance and become insufficient in sour gasoline resistance. On the other hand, if the amount of use is too large, the elongation is liable to fall.

The nitrile copolymer latex composition of the first embodiment contains, in addition to the nitrile copolymer rubber (A) and inorganic filler (B), a plasticizer (C) having an SP value (solubility parameter) by the HOY method of 8 to 10.2 $(cal/cm^3)^{1/2}$. If the SP value of the plasticizer is too large, the obtained rubber cross-linked product becomes inferior in cold resistance. Further, if too small, the obtained rubber cross-linked product deteriorates in gasoline permeability resistance.

As specific examples of the plasticizer (C) having an SP value by the HOY method of 8 to 10.2 $(cal/cm^3)^{1/2}$ (unit of SP value of "$(cal/cm^3)^{1/2}$"), for example, dibutoxyethyl adipate (SP value: 8.8), di(butoxyethoxyethyl)adipate (SP value: 9.2), and other ester compounds of adipic acid and ether-bond containing alcohols; dibutoxyethyl azelate, di(butoxyethoxyethyl)azelate, and other ester compounds of azelaic acid and ether-bond containing alcohols; dibutoxyethyl sebacate, di(butoxyethoxyethyl)sebacate, and other ester compounds of sebacic acid and ether-bond containing alcohols; dibutoxyethyl phthalate, di(butoxyethoxyethyl)phthalate, and other ester compounds of phthalic acid and ether-bond containing alcohols; dibutoxyethyl isophthalate, di(butoxyethoxyethyl) isophthalate, and other ester compounds of isophthalic acid and ether-bond containing alcohols; di-(2-ethylhexyl)adipate (SP value: 8.5), diisodecyl adipate (SP value: 8.3), diisononyl adipate, dibutyl adipate (SP value: 8.9), and other adipic acid dialkyl esters; di-(2-ethylhexyl)azelate (SP value: 8.5), diisooctyl azelate, di-n-hexyl azelate, and other azelaic acid dialkyl esters; di-n-butyl sebacate (SP value: 8.7), di-(2-ethylhexyl)sebacate (SP value: 8.4), and other sebacic acid dialkyl esters; dibutyl phthalate (SP value: 9.4), di-(2-ethylhexyl)phthalate (SP value: 9.0), di-n-octyl phthalate, diisobutyl phthalate, diheptyl phthalate (SP value: 9.0), diisodecyl phthalate (SP value: 8.5), diundecyl phthalate (SP value: 8.5), diisononyl phthalate (SP value: 8.9), and other phthalic acid dialkyl esters; dicyclohexyl phthalate, and other phthalic acid dicycloalkyl esters; diphenyl phthalate, butylbenzyl phthalate (SP value: 10.2), and other phthalic acid aryl esters; di-(2-ethylhexyl)isophthalate, diisooctyl isophthalate, and other isophthalic acid dialkyl esters; di-(2-ethylhexyl)tetrahydrophthalate, di-n-octyl tetrahydrophthalate, diisodecyl tetrahydrophthalate, and other tetrahydrophthalic acid dialkyl esters; tri-(2-ethylhexyl)trimellitate (SP value: 8.9), tri-n-octyl trimellitate (SP value: 8.9), triisodecyl trimellitate (SP value: 8.4), triisooctyl trimellitate, tri-n-hexyl trimellitate, triisononyl trimellitate (SP value: 8.8), triisodecyl trimellitate (SP value: 8.8), and other trimellitic acid derivatives; epoxylated soybean oil (SP value: 9.0), epoxylated linseed oil (SP value: 9.3), and other epoxy-based plasticizers; tricresyl phosphate (SP value: 9.7), and other phosphoric acid ester-based plasticizers; etc. may be mentioned. These may be used alone or in combinations of a plurality of types.

Among these as well, since the obtained cross-linked product can be made better in embrittlement temperature and gasoline permeability, ester compounds of adipic acid, azelaic acid, sebacic acid, phthalic acid, and other diprotic acids and ether-bond containing alcohols are preferable, ester compounds of adipic acid and ether-bond containing alcohols are more preferable, and di(butoxyethoxyethyl)adipate is particularly preferable.

The content of the plasticizer (C) in the nitrile copolymer latex composition of the first embodiment is, with respect to the nitrile copolymer rubber (A) as 100 parts by weight, 0.1 to 200 parts by weight, preferably 1 to 150 parts by weight, more preferably 2 to 100 parts by weight. When the content of the plasticizer is within the above range, bleed can be prevented and also the effects of the present invention become more remarkable.

The nitrile copolymer latex composition of the first embodiment is preferably produced by the method of adding to the latex of the nitrile copolymer rubber (A) the aqueous dispersion of the inorganic filler (B) and the aqueous dispersion of the plasticizer (C) while stirring. Due to this, a latex composition of these ingredients uniformly mixed and dispersed is obtained.

The method of preparation of the aqueous dispersion of the inorganic filler (B) is not particularly limited, but it may be prepared by adding the inorganic filler (B) while strongly stirring aqueous medium. In this case, an aqueous medium containing a 0.1 to 10 wt % amount, with respect to the inorganic filler (B), of sodium polyacrylate, sodium tripolyphosphate, sodium hexametaphosphate, sodium pyrophosphate, sodium polymaleate, an Na salt of a β-naphthalene sulfonic acid-formalin condensate, or other dispersant or surfactant may also be used. One containing an anionic dispersant or surfactant is preferable. These may be used alone or in combinations of a plurality of types. The solid content concentration of the aqueous dispersion of the inorganic filler (B) is preferably 1 to 50 wt %, more preferably 2 to 40 wt %.

Furthermore, in the first embodiment, when preparing the aqueous dispersion of the inorganic filler (B), a wet type crusher may also be used to disperse the inorganic filler (B) into the water. By using a wet type crusher for dispersion, when the inorganic filler (B) secondarily agglomerates, it is possible to eliminate the secondary agglomeration of the inorganic filler (B) and the obtained cross-linked product can be made more superior in gasoline permeability. As the wet type crusher used in this case, a Nanomizer (made by Yoshida Kikai Co., Ltd.), Superwing Mill DM-200 (made by Estec Co., Ltd.), etc. may be mentioned, but if obtaining a similar effect, of course another wet type crusher may be used.

Further, the method of preparing the aqueous dispersion of the plasticizer (C) is not particularly limited, but it is preferable to prepare it by strongly stirring an aqueous medium containing an amount of surfactant of 0.5 to 10 wt % of the plasticizer while adding a plasticizer. As such a surfactant, potassium rosinate, sodium laurylsulfate, potassium oleate, sodium dodecylbenzene sulfonate, and other anionic surfactant; polyoxyethylene alkyl ether, polyoxyethylene alkyl ester, polyoxyethylene sorbitan alkyl ester, and other nonionic surfactants; didecyl dimethylammonium chloride, stearyl trimethyl ammonium chloride, and other cationic surfactants may be mentioned. Note that, the concentration of the plasticizer (C) in the aqueous dispersion is preferably 5 to 70 wt %.

The nitrile copolymer latex composition of the first embodiment may further contain an acryl-based resin and/or vinyl chloride-based resin. By including the acryl-based resin and/or vinyl chloride-based resin, when making a rubber cross-linked product, it is possible to further improve the ozone resistance. The content of the acryl-based resin and/or vinyl chloride-based resin is, with respect to the nitrile copolymer rubber (A) as 100 parts by weight, preferably 10 to 150 parts by weight, more preferably 15 to 125 parts by weight, furthermore preferably 20 to 100 parts by weight. If the content of the acryl-based resin and/or vinyl chloride-based resin is too small, the effect of addition becomes difficult to obtain. On the other hand, if too large, the cold resistance is liable to deteriorate. Note that, the method of including the acryl-based resin and/or vinyl chloride-based resin is not particularly limited. For example, it is possible to mix the acryl-based resin and/or vinyl chloride-based resin in the latex state produced by emulsion polymerization in the above nitrile copolymer latex composition (latex blending).

Nitrile Copolymer Rubber Composition and Cross-Linkable Nitrile Copolymer Rubber Composition The nitrile copolymer rubber composition of the first embodiment may be obtained by coagulating the above nitrile copolymer latex composition and in accordance with need rinsing and drying the result.

The coagulation of the nitrile copolymer latex composition is not particularly limited. Freeze coagulation, dry coagulation, coagulation by a water-soluble organic liquid, salting out coagulation, or another known method may be applied. Among these, salting out coagulation is preferred. Note that, the specific method of salting out coagulation is not particularly limited. For example, it is also possible to employ a method similar to the later explained third embodiment.

Further, when preparing the nitrile copolymer rubber composition of the first embodiment, it may be obtained by introducing into the latex of the nitrile copolymer rubber (A) the total amount or part of all of one or more of the inorganic filler (B), plasticizer(C), acryl-based resin and/or vinyl chloride-based resin used in accordance with need, and the coupling agent used in accordance with need, then coagulating and drying the result and kneading with the remaining ingredients by a roll, Bambury mixer, or other mixer.

The thus obtained nitrile copolymer rubber composition has a Mooney viscosity ($ML_{1+4}$, 100° C.) of preferably 5 to 300, more preferably 10 to 250.

Note that, the coupling agent is not particularly limited so long as it has organic functional group and hydrolyzed group. A titanate-based coupling agent and silane coupling agent are preferable, while a silane coupling agent is particularly preferable. The amount of use of the coupling agent is, with respect to the nitrile copolymer rubber (A) as 100 parts by weight, preferably 0.1 to 20 parts by weight, more preferably 0.3 to 18 parts by weight, furthermore preferably 0.5 to 16 parts by weight.

The cross-linkable nitrile copolymer rubber composition of the first embodiment is obtained by adding to the nitrile copolymer rubber composition obtained by the above method a cross-linking agent.

The cross-linking agent may be one normally used as a cross-linking agent of a nitrile-group containing copolymer rubber and is not particularly limited. As a typical cross-linking agent, a sulfur-based cross-linking agent or organic peroxide cross-linking agent cross-linking unsaturated bonds of the nitrile copolymer rubber (A) may be mentioned. These may be used alone or in combinations of a plurality of types. Among these, a sulfur-based cross-linking agent is preferable.

As the sulfur-based cross-linking agent, powdered sulfur, flowers of sulfur, precipitated sulfur, colloid sulfur, surface treated sulfur, insoluble sulfur, and other sulfur; sulfur chloride, sulfur dichloride, morpholine disulfide, alkyl phenol disulfide, dibenzothiadyl disulfide, N,N'-dithiobis(hexahydro-2H-azenopin-2), phosphorus-containing polysulfide, polymer polysulfide, and other sulfur-containing compounds; tetramethyl thiuram disulfide, selenium dimethyl dithiocarbamate, 2-(4'-morpholinodithio)benzothiazole, and other sulfur-donor compounds; etc. may be mentioned. These may be used alone or in combinations of a plurality of types.

As the organic peroxide cross-linking agent, dicumyl peroxide, cumen hydroperoxide, t-butylcumyl peroxide, p-menthane hydroperoxide, di-t-butyl peroxide, 1,3-bis(t-butylperoxyisopropyl)benzene, 1,4-bis(t-butylperoxyisopropyl) benzene, 1,1-di-t-butylperoxy-3,3-trimethyl cyclohexane, 4,4-bis-(t-butyl-peroxy)-n-butylvalerate, 2,5-dimethyl-2,5- di-t-butylperoxyhexane, 2,5-dimethyl-2,5-di-t-butylperoxyhexine-3,1,1-di-t-butylperoxy-3,5,5-trimethyl cyclohexane, p-chlorobenzoyl peroxide, t-butylperoxyisopropyl carbonate, t-butylperoxybenzoate, etc. may be mentioned. These may be used alone or in combinations of a plurality of types.

The content of the cross-linking agent in the cross-linkable nitrile copolymer rubber composition of the first embodiment is not particularly limited, but is, with respect to the nitrile copolymer rubber (A) as 100 parts by weight, preferably 0.1 to 10 parts by weight, more preferably 0.2 to 5 parts by weight.

When using an organic peroxide cross-linking agent, as a cross-linking aid, trimethylolpropane trimethacrylate, divinylbenzene, ethylene dimethacrylate, triallyl isocyanulate, and other polyfunctional monomers etc. may be jointly used. The amount of use of these cross-linking aids is not particularly limited, but is, with respect to the nitrile copolymer rubber (A) as 100 parts by weight, preferably 0.5 to 20 parts by weight in range.

When using a sulfur-based cross-linking agent, zinc oxide, stearic acid, and other cross-linking aids; guanidine-based, aldehyde-amine-based, aldehyde-ammonia-based, thiazole-based, sulphenamide-based, thiourea-based, and other cross-linking accelerators may be used together. The amounts of use of these cross-linking aids and cross-linking accelerators are not particularly limited, but are, with respect to the nitrile copolymer rubber (A) as 100 parts by weight, preferably 0.1 to 10 parts by weight in range.

Further, the nitrile copolymer rubber composition or cross-linkable nitrile copolymer rubber composition of the first embodiment may also have mixed into it, in accordance with need, the other compound agents used for general rubber, for example, a cross-linking retardant, antiaging agent, filler other than an inorganic filler (B), reinforcing agent, lubricant, adhesive, lubricating agent, processing aid, plasticizer other than the plasticizer (C), flame retardant, anti-fungal agent, anti-static agent, coloring agent.

As the antiaging agent, a phenol-based, amine-based, benzimidazole-based, phosphoric acid-based, and other antiaging agents may be used. Among the phenol-based ones, 2,2'-methylene bis(4-methyl-6-t-butylphenol) etc., among amine-based ones, 4,4'-bis($\alpha,\alpha$-dimethylbenzyl)diphenylamine, N-isopropyl-N'-phenyl-p-phenylene diamine, etc., and among the benzimidazole-based ones, 2-mercaptobenzimidazole etc. may be mentioned. These may be used alone or in combinations of a plurality of types.

As the filler, for example, carbon black, silica, calcium carbonate, aluminum silicate, magnesium silicate, calcium silicate, magnesium oxide, staple fiber, zinc(meth)acrylate, magnesium(meth)acrylate, and other $\alpha,\beta$-ethylene-based unsaturated carboxylic acid metal salts etc. may be mentioned. These fillers may be treated by a coupling treatment by a silane coupling agent, titanium coupling agent, etc. or treated by a surface modification treatment agent using a higher fatty acid, its metal salt, ester or amide or other higher fatty acid derivative, surfactant, etc.

Further, the nitrile copolymer latex composition, nitrile copolymer rubber composition, and cross-linkable nitrile copolymer rubber composition of the first embodiment may also contain a rubber other than the nitrile copolymer rubber (A) in a range not detracting from the effect of the present invention. The rubber other than the nitrile copolymer rubber (A) is not particularly limited, but an acrylonitrile-butadiene copolymer rubber other than the nitrile copolymer rubber (A), an acryl rubber, ethylene-acrylic acid copolymer rubber, fluorine rubber, styrene-butadiene copolymer rubber, ethylene-propylene copolymer rubber, ethylene-propylene-diene ternary copolymer rubber, natural rubber and polyisoprene rubber, ethylene-vinyl acetate copolymer, etc. may be mentioned. Note that, the amount of mixture when mixing rubber other than nitrile copolymer rubber (A) is, with respect to the nitrile copolymer rubber (A) as 100 parts by weight, preferably 100 parts by weight or less, more preferably 50 parts by weight or less, particularly preferably 30 parts by weight or less.

The cross-linkable nitrile copolymer rubber composition of the first embodiment has a Mooney viscosity (below, sometimes also called the "compound Mooney viscosity") ($ML_{1+4}$, 100° C.) of preferably 5 to 250, more preferably 10 to 200.

Rubber Cross-Linked Product

The rubber cross-linked product of the first embodiment is obtained by cross-linking the cross-linkable nitrile copolymer rubber composition of the above first embodiment.

When cross-linking the cross-linkable nitrile copolymer rubber composition of the first embodiment, it is shaped by a shaping machine corresponding to the shape of the shaped article (rubber cross-linked product) to be obtained, for example, an extruder, injection molding machine, press, roll, etc., then cross-linked by a reaction to fix the shape of the cross-linked product. At the time of cross-linking, it is possible to perform the cross-linking after shaping or perform the cross-linking simultaneous with the shaping. The shaping temperature is usually 10 to 200° C., preferably 25 to 120° C. The cross-linking temperature is usually 100 to 200° C., preferably 130 to 190° C., while the cross-linking time is usually 1 minute to 24 hours, preferably 2 minutes to 1 hour.

Further, depending on its shape, size, etc., the rubber cross-linked product sometimes is cross-linked at its surface, but is not sufficiently cross-linked at its inside, so the product may be further heated for secondary cross-linking.

The rubber cross-linked product of the first embodiment obtained in this way has a small gasoline permeability and a superior sour gasoline resistance and cold resistance. For this reason, this may be suitably used as a fuel hose etc. by making a hose comprised of one layer or two or more layers having the layer (I) comprised of the rubber cross-linked product of the first embodiment as at least one layer. Note that when a laminate of two or more layers, the layer (I) comprised of the rubber cross-linked product of the first embodiment may be used as any of an inside layer, intermediate layer, and outside layer. As the layer (II) forming the laminate other than the layer (I), the nitrile copolymer rubber (L) with a content of $\alpha,\beta$-ethylenically unsaturated nitrile monomer units of preferably 5 to 65 wt %, more preferably 18 to 55 wt %, one containing the nitrile copolymer rubber (L) and an acryl-based resin and/or vinyl chloride-based resin, or a fluorine rubber, chloroprene rubber, hydrin rubber, chlorosulfonated polyethylene rubber, acryl rubber, ethylene-acrylic acid copolymer, ethylene-propylene copolymer, ethylene-propylene-diene ternary copolymer, butyl rubber, isoprene rubber, natural rubber, styrene-butadiene copolymer, fluorine resin, polyamide resin, polyvinyl alcohol, ethylene-vinyl acetate copolymer resin, ethylene-vinyl alcohol copolymer resin, polybutylene naphthalate, polyphenylene sulfide, polyolefin resin, polyester resin, etc. may be mentioned. These may be used alone or in combinations of a plurality of types.

Further, in accordance with need, to bond the layer (I) and the layer (II), it is possible to include a phosphonium salt etc. at one or both of the layer (I) and the layer (II). It is also possible to use a new layer (III) as a bonding layer between the layer (I) and the layer (II). As the layer (III), it is possible to use a resin or rubber composition similar to the resin or rubber composition forming the above-mentioned layer (II). As the layer (III), it is possible to use the resin or rubber composition forming the above-mentioned layer (II) alone or in a combination of a plurality of types and possible to include phosphonium salts etc.

Here, the thickness of the layer (I) is preferably 0.1 to 10 mm, more preferably 0.5 to 5 mm. Further, in the case of a laminate of two or more layers, the thickness of the layers other than the layer (I) is preferably 0.1 to 10 mm, more preferably 0.5 to 5 mm. Such single-layer hoses and multi-layer hoses comprised of laminates of two or more layers may be suitably used, for example, as fuel hoses.

Note that, the method of producing hoses including the rubber cross-linked product of the first embodiment having the above described construction is not particularly limited, but the cross-linkable nitrile copolymer rubber composition of the first embodiment forming the hose of the first embodiment by using an extruder etc. to shape it into a tube and cross-linking this to thereby obtain the hose of the first embodiment has the property of being resistant to cracks in the mandrel, so a mandrel can be used for production.

That is, when making the hose a single layer one comprised of only the cross-linked product of the first embodiment, first the cross-linkable nitrile copolymer rubber composition of the first embodiment may be shaped into a tube, a mandrel inserted into the obtained tubular shaped article to fix it in shape, and the cross-linkable nitrile copolymer rubber composition cross-linked.

Alternatively, when making the hose a multiple layer one including the cross-linked product of the first embodiment, the cross-linkable nitrile copolymer rubber composition of the first embodiment and the resin or rubber composition forming the layers other than the layer comprised of the cross-linked product of the first embodiment may be laminated and shaped into a tube, a mandrel inserted into the obtained tubular shaped article to fix it in shape, and the cross-linkable nitrile copolymer rubber composition cross-linked.

Further, the rubber cross-linked product of the first embodiment is in addition suitable for packing, gaskets, O-rings, oil seals, and other seal members; oil hoses, fuel hoses, inlet hoses, gas hoses, brake hoses, coolant hoses, and other hoses. As the gas of the gas hoses, air, nitrogen, oxygen, hydrogen, carbon dioxide, carbon monoxide, methane, ethane, propane, dimethyl ether, LPG, etc. may be mentioned.

The nitrile copolymer latex composition of the first embodiment gives the nitrile copolymer rubber composition of the present invention and is also useful itself as a latex composition for covering uses. Note that, when used as a latex composition for covering, it is sufficient to add a cross-linking agent similar to the cross-linking agent used for the cross-linkable nitrile copolymer rubber composition. As the method of using the nitrile copolymer latex composition of the first embodiment to cover the object with rubber, the dip molding method of dipping in the latex composition of the first embodiment a ceramic, glass, metal, or other shaped article, then pulling it out and heating and fixing the layer deposited on the surface; the roll impregnation method of impregnating fibers with the latex composition of the first embodiment, squeezing them by rolls etc., then heating and fixing the result; the spray impregnation method of spraying fibers with the latex composition of the first embodiment and heating and fixing the result; the coating method of coating the surface of an object to be coated with the latex composition of the first embodiment and heating and fixing the result; etc. may be mentioned.

When using the nitrile copolymer latex composition of the first embodiment for the dip molding method, the solid content concentration is preferably 15 to 40 wt %, more preferably 25 to 35 wt %. By making the solid content concentration the above range, a dip molded article having a uniform film thickness can easily be obtained.

Further, when using the nitrile copolymer latex composition of the first embodiment for the roll impregnation method, the solid content concentration of the latex composition changes depending on the type of the fibers and the target deposition amount, but is preferably 5 to 30 wt %, more preferably 10 to 30 wt %. The permeation of the latex composition into the fiber is affected by the surface tension of the latex composition, so the surface tension is preferably adjusted to 20 to 50 mN/m. As the method for adjusting the surface tension of the latex composition, the method of adding an anionic surfactant or nonionic surfactant may be mentioned.

Furthermore, when using the nitrile copolymer latex composition of the first embodiment for a coating method, for example a paper or other base material is coated with the latex composition, then afterward a hot air dryer is used to dry the composition and form a coated layer on the base material. As the coater, a blade coater, roller coater, curtain coater, rod coater, and air knife coater, etc. may be mentioned. The solid content concentration of the latex composition is not particularly limited, but differs depending on the coater used. It is generally 10 to 60 wt %. The drying conditions after coating are generally 100 to 170° C. or so in temperature for several tens of seconds.

Second Embodiment

The nitrile copolymer latex composition of the second embodiment of the present invention (the second aspect of the present invention) is a latex composition of a nitrile copolymer rubber containing a latex of a nitrile copolymer rubber (A) having $\alpha,\beta$-ethylenically unsaturated nitrile monomer units in 10 to 75 wt %, conjugated diene monomer units in 5 to 89.9 wt %, and cationic monomer units and/or monomer units able to form cations in 0.1 to 20 wt %, an inorganic filler (B) having an aspect ratio of 30 to 2,000, and a coupling agent (D), the content of the coupling agent (D) with respect to the nitrile copolymer rubber (A) as 100 parts by weight being 0.1 to 20 parts by weight.

Nitrile Copolymer Latex Composition

As the nitrile copolymer rubber (A) and the latex of the nitrile copolymer rubber (A), ones similar to those of the above-mentioned first embodiment may be used. However, in the second embodiment, the preferable range of the ratio of content of the $\alpha,\beta$-ethylenically unsaturated nitrile monomer units with respect to all of the monomer units in the nitrile copolymer rubber (A) is 15 to 70 wt %, and the more preferable range is 20 to 65 wt %. Similarly, in the second embodiment, the preferable range of the ratio of content of the conjugated diene monomer units with respect to all of the monomer units is 15 to 84.7 wt %, more preferably 25 to 79.5 wt %. Note that, in the second embodiment, the preferable range of the ratio of content of the cationic monomer units and/or monomer units able to form cations with respect to all of the monomer units is similar to that in the above-mentioned first embodiment.

Further, as the inorganic filler (B), one similar to that of the above-mentioned first embodiment can be used. The amount may also be made similar to that in the above-mentioned first embodiment.

The coupling agent (D) is not particularly limited so long as one having organic functional group and hydrolyzed group, but a titanate-based coupling agent and silane coupling agent are preferable, while a silane coupling agent is particularly preferable. Further, as the coupling agent (D), since the effect of the present invention becomes more remarkable, one not including any sulfur atoms is preferable. By including the coupling agent (D), the dispersion of the nitrile copolymer rubber (A) and the inorganic filler (B) can be improved and the cold resistance in the case of forming a cross-linked product can be further improved.

As suitable specific examples of the coupling agent (D) not containing sulfur atoms, γ-glycidoxypropyltrimethoxysilane, γ-glycidoxypropylmethyldimethoxysilane, β-(3,4-epoxycyclohexyl)ethyltrimethoxysilane, γ-glycidoxypropylmethyldiethoxysilane, and other epoxy group-containing silane coupling agent; N-(β-aminoethyl)-γ-aminopropyltrimethoxysilane, γ-aminopropyltrimethoxysilane, γ-aminopropyltriethoxysilane, N-2-(aminoethyl)-3-aminopropyltrimethoxysilane, N-2-(aminoethyl)-3-aminopropyltriethoxysilane, 3-triethoxysilyl-N-(1,3-dimethyl-butylidene)propylamine, N-phenyl-3-aminopropyltrimethoxysilane, and other amino-group containing silane coupling agent; γ-methacryloxypropyltrimethoxysilane, γ-methacryloxypropyltris(β-methoxyethoxy)silane, γ-methacryloxypropylmethyldimethoxysilane, γ-methacryloxypropylmethyldiethoxysilane, γ-methacryloxypropyltriethoxysilane, γ-acryloxypropyltrimethoxysilane, and other (meth)acryloxy-group containing silane coupling agent; vinyltrimethoxysilane, vinyltriethoxysilane, vinyltris(β-methoxyethoxy)silane, vinyl trichlorosilane, vinyltriacetoxysilane, and other vinyl-group containing silane coupling agent; 3-chloropropyltrimethoxysilane and other chloropropyl-group containing silane coupling agent; 3-isocyanatepropyltriethoxysilane and other isocyanate-group containing silane coupling agents; p-styryltrimethoxysilane and other styryl-group containing silane coupling agent; 3-ureidopropyltriethoxysilane and other ureido-group containing silane coupling agents; diallyldimethylsilane and other allyl-group containing silane coupling agents; tetraethoxysilane and other alkoxy-group containing silane coupling agents; diphenyldimethoxysilane and other phenyl-group containing silane coupling agents; trifluoropropyltrimethoxysilane and other fluoro-group containing silane coupling agents; isobutyltrimethoxysilane, cyclohexylmethyl-dimethoxysilane, and other alkyl-group containing silane coupling agents: acetoalkoxyaluminum diisopropylate and other aluminum-based coupling agents; isopropyltriisostearoyl titanate, isopropyltris(dioctylpyrophosphate)titanate, isopropyltri(N-aminoethyl-aminoethyl)titanate, tetraoctylbis(ditridecylphosphite)titanate, tetra(2,2-diallyloxymethyl-1-butyl)bis(ditridecyl)phosphite titanate, bis(dioctylpyrophosphate)oxyacetate titanate, bis(dioctylpyrophosphate)ethylene titanate, tetraisopropylbis(dioctylphosphite)titanate, isopropyltriisostearoyl titanate, and other titanate-based coupling agents; etc. may be mentioned. These may be used alone or in combinations of a plurality of types.

Note that, in the second embodiment, the coupling agent (D) not containing sulfur atoms means a coupling agent substantially not containing sulfur atoms. For example, γ-mercaptopropyltrimethoxysilane, γ-mercaptomethyltrimethoxysilane, γ-mercaptomethyltriethoxysilane, γ-mercaptohexamethyldisilazane, bis(3-triethoxysilylpropyl)tetrasulfane, bis(3-triethoxysilylpropyl)disulfane, and other sulfur-containing coupling agents are excluded. However, the coupling agent (D) not containing sulfur atoms, for example, may be one containing sulfur in an extremely small amount of 500 weight ppm or less (about amount of impurity).

As the coupling agent (D) used in the second embodiment, one with a molecular weight of 300 or less is preferable, while one of 290 or less is more preferable. If using a coupling agent with a molecular weight which is too large, the effect of addition of the coupling agent, that is, the effect of improvement of the cold resistance sometimes can no longer be obtained.

The content of the coupling agent (D) is, with respect to the nitrile copolymer rubber (A) as 100 parts by weight, 0.1 to 20 parts by weight, preferably 0.3 to 18 parts by weight, more preferably 0.5 to 16 parts by weight. If the content of the coupling agent (D) is too small, the effect of improvement of the cold resistance can no longer be obtained. On the other hand, if too large, the gasoline permeability resistance is liable to fall.

Further, the nitrile copolymer latex composition of the second embodiment, from the viewpoint of the ability to improve the various characteristics, is preferably comprised of the latex of the nitrile copolymer rubber (A) and the inorganic filler (B) uniformly mixed and dispersed due to the effect of the coupling agent (D).

The method of preparing the nitrile copolymer latex composition of the second embodiment is not particularly limited, but the method of adding to the latex of the nitrile copolymer rubber (A) an aqueous dispersion containing an inorganic filler (B) and a coupling agent (D) under stirring; the method of adding to the latex of the nitrile copolymer rubber (A) an aqueous dispersion containing the inorganic filler (B) under stirring, then adding a coupling agent (D) or an aqueous solution (an aqueous dispersion) containing the coupling agent (D) under stirring; the method of adding to the latex of the nitrile copolymer rubber (A) a coupling agent (D) or an aqueous solution (an aqueous dispersion) containing the coupling agent (D) under stirring, then adding an aqueous dispersion containing the inorganic filler (B) under stirring; etc. may be mentioned. Due to these methods, the result becomes a latex composition comprised of the latex of the nitrile copolymer rubber (A) and the inorganic filler (B) uniformly mixed and dispersed.

Note that, the method of preparing the aqueous dispersion containing the inorganic filler (B) and the coupling agent (D) is not particularly limited, but it may be prepared by strongly stirring the aqueous medium while adding the inorganic filler (B) and the coupling agent (D). Further, an aqueous medium containing a 0.1 to 10 wt % amount, with respect to the inorganic filler (B), of sodium polyacrylate, sodium tripolyphosphate, sodium hexametaphosphate, sodium pyrophosphate, sodium polymaleate, an Na salt of a β-naphthalene sulfonic acid-formalin condensate, or other dispersant or surfactant may also be used. One containing an anionic dispersant or surfactant is preferable. These may be used alone or in combinations of a plurality of types. The solid content concentration of the aqueous dispersion of the inorganic filler (B) is preferably 1 to 50 wt %, more preferably 2 to 40 wt %. Further, the concentration of the coupling agent (D) may be made an amount commensurate with the finally obtained latex composition.

Further, the method of preparation of the aqueous dispersion of the inorganic filler (B) is not particularly limited, but it may be made similar to the above-mentioned first embodiment.

Furthermore, the method of preparation of the aqueous solution (an aqueous dispersion) of the coupling agent (D) is not particularly limited, but it may be prepared by strongly stirring the aqueous medium while adding the coupling agent (D). Further, it may also be prepared by strongly stirring an aqueous medium containing an amount of surfactant of 0.5 to 10 wt % of the coupling agent (D) while adding the coupling agent. As such a surfactant, potassium rosinate, sodium lauryl sulfate, potassium oleate, sodium dodecyl benzene sulfonate, and other anionic surfactants; polyoxyethylene alkyl ether, polyoxyethylene alkyl ester, polyoxyethylene sorbitan alkyl ester, and other nonionic surfactants; didecyl dimethylammonium chloride, stearyl trimethyl ammonium chloride, and other cationic surfactant; etc. may be mentioned.

Furthermore, in the second embodiment, when preparing the aqueous dispersion of the inorganic filler (B) or the aqueous dispersion of the inorganic filler (B) and the coupling agent (D), a wet type crusher may also be used to disperse the inorganic filler (B) and coupling agent (D) into the water. By using a wet type crusher for dispersion, when the inorganic filler (B) secondarily agglomerates, it is possible to eliminate the secondary agglomeration of the inorganic filler (B) and the obtained cross-linked product can be made more superior in gasoline permeability. As the wet type crusher used in this case, a Nanomizer (made by Yoshida Kikai Co., Ltd.), Superwing Mill DM-200 (made by Estec Co., Ltd.), etc. may be mentioned, but if obtaining a similar effect, of course another wet type crusher may be used.

Note that, the nitrile copolymer latex composition of the second embodiment may further have a plasticizer (C) introduced into it since the effect of the present invention becomes even more remarkable. Even when including the plasticizer (C), the plasticizer (C) is preferably uniformly mixed and dispersed into the nitrile copolymer latex composition. As the plasticizer (C), one used as a plasticizer for rubber formulations in the past may be used. While not particularly limited, a plasticizer (C) having an SP value (solubility parameter) by the HOY method of 8 to 10.2 $(cal/cm^3)^{1/2}$ is preferable. Note that, as specific examples of the plasticizer (C) having an SP value (solubility parameter) by the HOY method of 8 to 10.2 $(cal/cm^3)^{1/2}$, ones similar to those of the above-mentioned first embodiment may be mentioned. The content of the plasticizer (C) in the second embodiment is, with respect to the nitrile copolymer rubber (A) as 100 parts by weight, preferably 0.1 to 200 parts by weight, more preferably 1 to 150 parts by weight, particularly preferably 2 to 100 parts by weight. If the content of the plasticizer is too small, the obtained rubber cross-linked product sometimes becomes too high in embrittlement temperature. On the other hand, if too large, there is a possibility of bleed occurring.

The method of adding the plasticizer (C) to the nitrile copolymer latex composition used in the second embodiment is not particularly limited, but the method of adding to the nitrile copolymer latex composition an aqueous dispersion (emulsion) of the plasticizer (C) given a plasticizer concentration of 5 to 70 wt % under stirring is preferably employed. Due to this, the nitrile copolymer rubber (A), inorganic filler (B), coupling agent (D), and plasticizer (C) may be uniformly mixed and dispersed. Note that the method of preparation of the aqueous dispersion of the plasticizer (C) is not particularly limited, but for example it may be made a method similar to the above-mentioned first embodiment.

Further, the nitrile copolymer latex composition of the second embodiment, like in the above-mentioned first embodiment, may further contain an acryl-based resin and/or vinyl chloride-based resin. The blending amount and blending method may also be made similar to those of the above-mentioned first embodiment.

Nitrile Copolymer Rubber Composition and Cross-Linkable Nitrile Copolymer Rubber Composition The nitrile copolymer rubber composition of the second embodiment can be obtained by coagulating the above nitrile copolymer latex composition of the second embodiment and in accordance with need rinsing and drying the result.

The nitrile copolymer rubber composition of the second embodiment has a Mooney viscosity ($ML_{1+4}$, 100° C.) of preferably 5 to 300, more preferably 10 to 250.

The cross-linkable nitrile copolymer rubber composition of the second embodiment is obtained by adding to the nitrile copolymer rubber composition obtained by the above method a cross-linking agent. As the cross-linking agent, it is possible to use one similar to that of the above-mentioned first embodiment. The amount of use may be made the same as in the above-mentioned first embodiment. Further, in the second embodiment, like in the above-mentioned first embodiment, in accordance with need, it is also possible to use a cross-linking aid, cross-linking accelerator, or other various types of compounding agents or rubber other than nitrile copolymer rubber (A). The amounts of use may also be made similar to those of the above-mentioned first embodiment.

The cross-linkable nitrile copolymer rubber composition of the second embodiment has a Mooney viscosity ($ML_{1+4}$, 100° C.) of preferably 5 to 250, more preferably 10 to 200.

Rubber Cross-Linked Product

The rubber cross-linked product of the second embodiment is obtained by cross-linking the cross-linkable nitrile copolymer rubber composition of the above second embodiment. The cross-linkable nitrile copolymer rubber composition of the second embodiment may be cross-linked in accordance with a method similar to the above-mentioned first embodiment.

The rubber cross-linked product of the second embodiment has a small gasoline permeability and superior sour gasoline resistance and cold resistance. For this reason, the rubber cross-linked product of the second embodiment may be suitably used for various applications illustrated in the above-mentioned first embodiment. Furthermore, the nitrile copolymer latex composition of the second embodiment, in the same way as the above-mentioned first embodiment, is useful for giving the nitrile copolymer rubber composition of the present invention and also itself as a covering use latex composition.

Third Embodiment

The method of production of a nitrile copolymer rubber composition of a third embodiment of the present invention (the third aspect of the present invention) is a method of production of a nitrile copolymer rubber composition by coagulation of the nitrile copolymer latex composition of the above-mentioned first embodiment or second embodiment, wherein the coagulation of said nitrile copolymer latex composition is performed by using a coagulating agent comprised of a salt containing metal ions whose ionic valency is 1 to 3 under conditions of pH 5.0 or less.

Method of Production of a Nitrile Copolymer Rubber Composition

The salt containing metal ions whose ionic valency is 1 to 3 of the coagulating agent used in the third embodiment is not particularly limited so long as a salt containing a metal giving metal ions whose ionic valency is 1 to 3 when dissolved in water. For example, a salt of an inorganic acid selected from hydrochloric acid, nitric acid, sulfuric acid, etc. or an organic acid such as acetic acid and a metal selected from sodium, potassium, lithium, magnesium, calcium, zinc, titanium, manganese, iron, cobalt, nickel, aluminum, tin, etc. may be mentioned. Further, hydroxides of these metals may also be used.

As specific examples of the salt containing metal ions whose ionic valency is 1 to 3, sodium chloride, potassium chloride, lithium chloride, magnesium chloride, calcium chloride, zinc chloride, titanium chloride, manganese chloride, iron chloride, cobalt chloride, nickel chloride, aluminum chloride, stannous chloride, and other metal chlorides; sodium nitrate, potassium nitrate, lithium nitrate, magnesium nitrate, calcium nitrate, zinc nitrate, titanium nitrate, manganese nitrate, iron nitrate, cobalt nitrate, nickel nitrate, aluminum nitrate, stannous nitrate, and other nitrates; sodium sulfate, potassium sulfate, lithium sulfate, magnesium sulfate, calcium sulfate, zinc sulfate, titanium sulfate, manganese sulfate, iron sulfate, cobalt sulfate, nickel sulfate, aluminum sulfate, stannous sulfate, and other sulfates; etc. may be mentioned. Among these, calcium chloride, sodium chloride, aluminum sulfate, magnesium chloride, magnesium sulfate, zinc chloride, and zinc sulfate are preferred. Further, these may be used alone or in combinations of a plurality of types.

The method of using such a salt including metal ions whose ionic valency is 1 to 3 as a coagulating agent to make the nitrile copolymer rubber composition coagulate is not particularly limited, for example, the method of preparing a coagulating solution comprised of the above-mentioned coagulating agent and water and bringing this coagulating solution and the nitrile copolymer latex composition into contact to cause coagulation by salting out, the method of directly adding a coagulating agent to the nitrile copolymer latex composition and bringing these into contact to cause coagulation, etc. may be mentioned. Among these, the method of bringing the coagulating solution and nitrile copolymer latex composition into contact for coagulation is preferable, for example, by adding a nitrile copolymer latex composition into the coagulating solution, it is possible to bring these into contact to cause coagulation by salting out.

Further, in the third embodiment, the coagulation pH when using a salt containing metal ions whose ionic valency is 1 to 3 as a coagulating agent to coagulate a nitrile copolymer latex composition (pH of mixed solution of coagulating agent or coagulating solution and nitrile copolymer latex composition at time of coagulation) is made 5.0 or less, preferably 4.5 or less, more preferably 4.0 or less. Note that, the lower limit of the above coagulation pH is preferably 0.1 or more, more preferably 1 or more.

By using a salt containing metal ions whose ionic valency is 1 to 3 as a coagulating agent and making the pH 5.0 or less in range to coagulate a nitrile copolymer latex composition and produce a nitrile copolymer rubber composition, the zeta potential of the functional groups of the cationic monomer units and/or monomer units able to form cations included in the nitrile copolymer rubber (A) rises. Due to this, the dispersibility of the inorganic filler (B) is improved, so the obtained rubber cross-linked product can be made superior in the cold resistance and sour gasoline resistance and the gasoline permeability can be further reduced. If the pH at the time of coagulation is too high, the obtained cross-linked product ends up becoming larger in gasoline permeability. Further, even if the pH at the time of coagulation is in the above range, when using a coagulating agent other than the salt containing metal ions whose ionic valency is 1 to 3 as a coagulating agent, the effect of reduction of the gasoline permeability becomes difficult to obtain and the obtained cross-linked product ends up becoming larger in gasoline permeability.

Note that, the method of making the pH at the time of coagulation the above range is not particularly limited. The method of adjusting the pH of the coagulating solution containing the coagulating agent to make the coagulation pH the above range, the method of adjusting the pH of the nitrile copolymer latex composition to make the coagulation pH the above range, the method of adjusting the pH of the coagulating solution containing the coagulating agent and the pH of the nitrile copolymer latex composition to make the coagulation pH the above range and in addition the method of bringing the coagulating solution and nitrile copolymer latex composition into contact during which further adding a dilute sulfuric acid aqueous solution or other pH adjusting aqueous solution to make the coagulation pH the above range etc. may be mentioned. Note that, the coagulating solution and the nitrile copolymer latex composition can be adjusted in pH by adding to these the aqueous solution for adjustment of the pH of a dilute sulfuric acid aqueous solution.

Further, in the third embodiment, if using the salt containing metal ions whose ionic valency is 1 to 3 as a coagulating agent and making the pH 5.0 or less in range, coagulation is possible while jointly using a heat-sensitive coagulating agent, polymer flocculant, water-soluble organic liquid, etc. or coagulation is possible while blowing in steam. The coagulation temperature is not particularly limited, but 10° C. or more is preferable. Note that, the upper limit of the coagulation temperature is preferably 98° C. or less, more preferably 80° C. or less.

The amount of use of the coagulating agent is, with respect to the nitrile copolymer rubber (A) in the nitrile copolymer latex composition as 100 parts by weight, preferably 0.5 to 200 parts by weight, more preferably 0.5 to 150 parts by weight.

Further, the crumbs of the nitrile copolymer rubber composition obtained after coagulation preferably have an average particle size of 0.1 to 40 mm. In general, the crumb size has a large affect on the degree of dewatering at the vibrating screen or squeezer after the coagulation and washing steps, the crumb recovery rate, and, furthermore, the drying degree at the drying step. For example, if the crumb size is too small, at the vibrating screen etc., the crumbs will be flushed out from the mesh of the screen or the polymer will be insufficiently squeezed by the squeezer and the degree of dewatering will fall resulting in a drop in productivity. For this reason, the crumb size is preferably in the above range.

Regarding the method of washing, dewatering, and drying the crumbs, the same method as the method of washing and dewatering and the method of drying in the production of general rubber can be used. As the washing and dewatering method, a net-like filter, centrifugal separator, etc. may be used to separate the crumbs obtained by coagulation and the water, the crumbs washed, and a squeezer etc., used to dewater the crumbs. Next, in general, a band drier, ventilating vertical dryer, twin-screw extruder, etc. used for the production of rubber may be used to dry the crumbs until a predetermined moisture content rate so as to obtain the nitrile copolymer rubber composition of the third embodiment. Further, the coagulation and drying may be simultaneously performed inside a twin-screw extruder.

Further, the nitrile copolymer rubber composition produced in the third embodiment may be obtained by introducing into the nitrile copolymer latex composition of the above-mentioned first embodiment or second embodiment the vinyl chloride-based resin and/or acryl-based resin and plasticizer in full or part of all or part, coagulating using a salt containing metal ions whose ionic valency is 1 to 3 as a coagulating agent at a pH of 5.0 or less in range, drying, then kneading into the rubber composition the remaining ingredient by rolls or Bambury mixer or another mixer (mixed by dry blending).

Alternatively, the nitrile copolymer rubber composition produced in the third embodiment may be obtained by coagulating using a salt containing metal ions whose ionic valency is 1 to 3 as a coagulating agent at a pH of 5.0 or less in range, drying, then kneading into the rubber composition a vinyl chloride-based resin and/or acryl-based resin and plasticizer by rolls or Bambury mixer or another mixer (mixed by dry blending).

That is, in the method of production of the third embodiment, it is possible to mix into the above-mentioned nitrile copolymer rubber composition 10 to 150 parts by weight of a vinyl chloride-based resin and/or acryl-based resin with respect to the nitrile copolymer rubber (A) as 100 parts by weight by dry blending.

The thus obtained nitrile copolymer rubber composition had a Mooney viscosity of preferably 5 to 300, more preferably 15 to 180.

Cross-Linkable Nitrile Copolymer Rubber Composition

The cross-linkable nitrile copolymer rubber composition of the third embodiment is obtained by adding to the nitrile copolymer rubber composition obtained by the above method a cross-linking agent. As the cross-linking agent, it is possible to use one similar to that of the above-mentioned first embodiment. The amount of use may be made the same as in the above-mentioned first embodiment. Further, in the third embodiment, like in the above-mentioned first embodiment, in accordance with need, it is also possible to mix in a cross-linking aid or cross-linking accelerator and other various compounding agents and rubber other than the nitrile copolymer rubber (A). The amounts of use may also be made similar to those of the above-mentioned first embodiment.

The cross-linkable nitrile copolymer rubber composition of the third embodiment has a Mooney viscosity ($ML_{1+4}$, 100° C.) of preferably 5 to 250, more preferably 10 to 150.

Rubber Cross-Linked Product

The rubber cross-linked product of the third embodiment is obtained by cross-linking the above cross-linkable nitrile copolymer rubber composition of the third embodiment. The cross-linkable nitrile copolymer rubber composition of the third embodiment may be cross-linked by a method similar to that of the above-mentioned first embodiment.

The rubber cross-linked product of the third embodiment has a small gasoline permeability and a superior sour gasoline resistance and cold resistance. For this reason, the rubber cross-linked product of the third embodiment can be suitably used for the various applications illustrated in the above-mentioned first embodiment.

EXAMPLES

Below, examples and comparative examples will be given to explain the present invention specifically. However, the present invention is not limited to these examples. In the following formulations, the "parts" are based on weight unless otherwise indicated.

The tests and evaluations were performed as follows:

Isoelectric Point of Nitrile Copolymer Latex

The isoelectric point of the nitrile copolymer latex was measured by a microscope type electrophoresis speed measurement system (Mark II electrophoresis speed measurement system made by Rank Brothers Ltd.).

Mooney Viscosity

The Mooney viscosity (polymer Mooney viscosity and compound Mooney viscosity) ($ML_{1+4}$, 100° C.) of the nitrile copolymer rubber and cross-linkable nitrile copolymer rubber composition was measured in accordance with JIS K6300.

Normal Physical Properties (Tensile Strength, Elongation, 100% Tensile Stress, Hardness)

The cross-linkable nitrile copolymer rubber composition was placed in a length 15 cm, width 15 cm, depth 0.2 cm mold and press formed while pressing at 160° C. for 20 minutes to obtain sheet-shaped rubber cross-linked product. The obtained sheet-shaped rubber cross-linked product was punched into JIS No. 3 dumbbell shapes to prepare test pieces, and the test pieces were used in accordance with JIS K6251 to measure the tensile strength, elongation, and 100% tensile stress and further in accordance with JIS K6253 to measure the hardness of the rubber cross-linked product using a Durometer hardness tester type A.

Gasoline Permeation Coefficient

Sheet-shaped rubber cross-linked product similar to the one used for evaluation of the above normal physical properties was prepared, "a mixture of isoctane, toluene, and ethanol in a weight ratio of 2:2:1" as fuel oil was used, and the aluminum cup method was employed to measure the gasoline permeation coefficient. Specifically, a 100 ml capacity aluminum cup was filled with the above fuel oil to 50 ml, the sheet-shaped rubber cross-linked product was placed over it to cap it, then fasteners were used to adjust the area by which the sheet-shaped rubber cross-linked product separated the inside and outside of the aluminum cup to 25.50 cm$^2$, the aluminum cup was allowed to stand in a 23° C. constant temperature tank, then the weight was measured every 24 hours to thereby measure the amount of permeation of the oil every 24 hours. The maximum amount was defined the amount of permeation (unit: g·mm/m$^2$·day).

Note that, the lower the gasoline permeation coefficient, the better the gasoline permeability resistance, so the more preferable.

Embrittlement Temperature

Sheet-shaped rubber cross-linked product similar to the one used for evaluation of the above normal physical properties was used in accordance with JIS K6261 to measure the embrittlement temperature.

Sour Gasoline Resistance Test

Sheet-shaped rubber cross-linked product similar to the one used for evaluation of the above normal physical properties was prepared. As a fuel oil, "a mixture of isoctane, toluene, and ethanol in a weight ratio of 2:2:1" into which dilauroyl peroxide was dissolved in a concentration of 3 wt % was prepared to be test oil. The sheet-shaped rubber cross-linked product was immersed in this test oil under conditions of a temperature of 40° C. and 500 hours (test oil changed with new one at rate of twice in 168 hours). Further, after 500 hours, the sample was tested based on JIS K6253 by a tensile test. The presence of any cracks at the time of stretching by the tensile test was examined to evaluate the sour gasoline resistance.

First, Examples 1-1 to 1-7 and Comparative Examples 1-1 to 1-8 according to the first embodiment of the present invention (first aspect of the present invention) will be explained.

Example 1-1

Production of Latex of Nitrile Copolymer Rubber

A reaction vessel was charged with water in 240 parts, acrylonitrile in 75.7 parts, 2-vinyl pyridine in 2.2 parts, and sodium dodecylbenzene sulfonate (emulsifier) in 2.5 parts and adjusted in temperature to 5° C. Next, the vapor phase was reduced in pressure and sufficiently deaerated, then 1,3-butadiene in 22 parts, the polymerization initiator of para-mentane hydroperoxide in 0.06 part, sodium ethylene diamine tetracetate in 0.02 part, iron(II) sulfate (7 hydrate) in 0.006 part, and sodium formaldehyde sulfoxylate in 0.06 part, and the chain transfer agent of t-dodecylmercaptan in 1 part were added to start the first stage reaction of the emulsion polymerization. After the start of the reaction, when the polymer conversion rate with respect to the charged monomer reached 40 to 42 wt % and 60 wt %, 1,3-butadiene was added to the reaction vessel in respective amounts of 12 parts and 12 parts for the second and third stage polymerization reactions. Afterward, when the polymer conversion rate with respect to the entire charged monomer reached 75 wt %, hydroxylamine sulfate in 0.3 part and potassium hydroxide in 0.2 part were added to make the polymerization reaction stop. After the reaction stopped, the content in the reaction vessel was warmed to 70° C. and the unreacted monomer was recovered by steam distillation under reduced pressure to obtain a latex of a nitrile copolymer rubber (n1) (solid content: 24 wt %).

The ratios of content of the monomers forming the obtained nitrile copolymer rubber (n1) were measured by using an FT NMR apparatus (JNM-EX400WB) made by JOEL, whereupon the result was acrylonitrile monomer units in 50 wt %, 1,3-butadiene monomer units in 48 wt %, and 2-vinyl pyridine monomer units in 2 wt %. Further, the nitrile copolymer rubber (n1) had a Mooney viscosity (polymer Mooney viscosity) of 73. Further, the latex of the nitrile copolymer rubber (n1) had a pH of the isoelectric point of 2.6.

Preparation of Nitrile Copolymer Latex Composition and Nitrile Copolymer Rubber Composition An inorganic filler (B) of refined montmorillonite (product name "Kunipia F", made by Kunimine Industries) in 100 parts was added to distilled water in 1995 parts in the presence of sodium polyacrylate in 5 parts and strongly stirred to obtain an aqueous dispersion of an inorganic filler of a solid content concentration of 5% and a pH of 10. Further, a plasticizer (C) of di(butoxyethoxyethyl)adipate (product name "Adekasizer RS-107", made by Adeka Corporation, plasticizer) in a 50 wt % aqueous emulsion was prepared by mixing with strongly stirring using potassium oleate as an emulsifier in an amount of 2 wt % of the plasticizer.

Further, while stirring the nitrile copolymer rubber (n1) latex obtained above in the vessel, the above prepared inorganic filler aqueous dispersion was added and dispersed. Note that, the inorganic filler aqueous dispersion was added to give inorganic filler in 20 parts with respect to the solids content of the latex of the nitrile copolymer rubber (n1) (amount of nitrile copolymer rubber) as 100 parts and thereby give a solid content (nitrile copolymer rubber and inorganic filler) concentration of 15%.

Next, to the latex of the nitrile copolymer rubber (n1) in which the inorganic filler was dispersed, the above prepared emulsion containing di(butoxyethoxyethyl)adipate in 20 parts (amount of plasticizer of 10 parts) was added and mixed and dispersed with respect to the nitrile copolymer rubber (n1) as 100 parts to obtain a nitrile copolymer latex composition. Further, the obtained nitrile copolymer latex composition was poured into an aqueous solution containing calcium chloride (coagulating agent) of 4 wt % with respect to the amount of nitrile copolymer rubber (n1) in the latex composition under stirring while suitably adding 10% dilute sulfuric acid to adjust the pH so that the pH of the aqueous solution during coagulation became a pH 2 of the isoelectric point or less to thereby form crumbs comprised of a mixture of the nitrile copolymer rubber (n1), inorganic filler, and plasticizer (below, mixing the nitrile copolymer rubber, inorganic filler, and, in accordance with need, plasticizer in this procedure will be called "wet blending").

Further, the obtained crumbs were filtered, rinsed, then dried in a vacuum at 60° C. to obtain a nitrile copolymer rubber composition. Note that, the clay (refined montmorillonite) was measured for aspect ratio by an atomic force microscope. The result was 300.

Preparation of Cross-Linkable Nitrile Copolymer Rubber Composition

Next, a Bambury mixer was used, FEF carbon black (Seast SO, made by Tokai Carbon Co., LTD.) in 2 parts, cross-linking aids of zinc white in 5 parts, and stearic acid in 1 part were added with respect to 100 parts of the nitrile copolymer rubber (n1) in the nitrile copolymer rubber composition and mixed at 50° C. Then, this mixture was transferred to rolls and kneaded with cross-linking agent of 325 mesh sulfur in 0.5 part, tetramethyl thiuram disulfide (brand name "Noccelar TT", made by Ouchi Shinko Chemical Industrial) in 1.5 part, and N-cyclohexyl-2-benzothiazolyl sulphenamide (brand name "Noccelar CZ", made by Ouchi Shinko Chemical Industrial, cross-linking accelerator) in 1.5 parts at 50° C. to prepare a cross-linkable nitrile copolymer rubber composition.

Further, the cross-linkable nitrile copolymer rubber composition obtained was evaluated for the Mooney viscosity (compound Mooney viscosity) and the rubber cross-linked product obtained by cross-linking the composition was evaluated for normal physical properties (tensile strength, elongation, 100% tensile stress, and hardness), gasoline permeation coefficient, embrittlement temperature, and sour gasoline resistance in accordance with the above method. The results are shown in Table 1.

Example 1-2

In Example 1-1, the charged monomers in the first stage reaction of the emulsion polymerization when producing the nitrile copolymer rubber were changed to acrylonitrile in 23.2 parts, 1,3-butadiene in 74 parts, and 2-vinyl pyridine in 2.8 parts and the first stage reaction started. After the start of the reaction, when the polymer conversion rate with respect to the charged monomers reached 38 wt % and 60 wt %, 1,3-butadiene was added to the reaction vessel in respective amounts of 4 parts and 2.8 parts for the second and third stage polymerization reactions. Afterward, when the polymer conversion rate with respect to all charged monomers reached 75 wt %, hydroxylamine sulfate in 0.3 part and potassium hydroxide in 0.2 part were added to make the polymerization reaction stop. After the reaction stopped, the content of the reaction vessel was warmed to 70° C. and the unreacted monomer was recovered by steam distillation under reduced pressure to obtain a latex of a nitrile copolymer rubber (n2) (solid content: 24 wt %). The latex of the nitrile copolymer rubber (n2) had a pH of the isoelectric point of 2.7. Further, the nitrile copolymer rubber (n2) had ratios of content of the monomers of the acrylonitrile monomer units in 30 wt %, 1,3-butadiene monomer units in 68 wt %, and 2-vinyl pyridine monomer units in 2 wt % and had a Mooney viscosity of 75. Further, except for using the obtained nitrile copolymer rubber (n2), the same procedure was followed as in Example 1-1 to prepare compositions. This was similarly evaluated. The results are shown in Table 1.

Example 1-3

Except for, In Example 1-1, further adding to the nitrile copolymer rubber (n1) as 100 parts, a latex of vinyl chloride resin (vinyl chloride resin of 45 parts) and making the amount of the plasticizer (C) of the di(butoxyethoxyethyl)adipate 30 parts when preparing the cross-linkable nitrile copolymer rubber composition, the same procedure was followed as in Example 1-1 to prepare the nitrile copolymer rubber composition. The obtained nitrile copolymer rubber composition was kneaded by rolls at 170° C. for 5 minutes, then a crosslinkable nitrile copolymer rubber composition was prepared in the same way as in Example 1-1. This was similarly evaluated. The results are shown in Table 1.

Example 1-4

Except for further adding to the nitrile copolymer rubber (n1) as 100 parts, a latex of acryl resin (acryl resin of 45 parts) and making the amount of the plasticizer (C) of the di(butoxyethoxyethyl)adipate 30 parts when preparing the crosslinkable nitrile copolymer rubber composition, the same procedure was followed as in Example 1-1 to prepare compositions. This was similarly evaluated. The results are shown in Table 1.

Example 1-5

Except for using sodium tetrasilicate mica (synthetic mica, product name: DMA-350, made by Topy Industries) as the inorganic filler, the same procedure was followed as in Example 1-1 to prepare compositions. This was similarly evaluated. The results are shown in Table 1. Note that, the synthetic mica was measured for the aspect ratio by an atomic force microscope, the result was 1,000.

Example 1-6

Except for using synthetic saponite (product name "Smecton SA", made by Kunimine Industries) as the inorganic filler, the same procedure was followed as in Example 1-1 to prepare compositions. This was similarly evaluated. The results are shown in Table 1. Note that, the aspect ratio was measured by an atomic force microscope, the result was 50.

Example 1-7

Except for, In Example 1-1, changing the charged monomers of the first stage reaction when producing the nitrile copolymer rubber to acrylonitrile in 76.7 parts, 1,3-butadiene in 21.8 parts, and N,N-dimethyl aminopropylacrylamide in 1.5 parts, the same procedure was followed as in Example 1-1 to obtain a nitrile copolymer rubber (n3) having acrylonitrile monomer units in 50 wt %, 1,3-butadiene units in 48 wt %, and N,N-dimethyl aminopropylacrylamide monomer units in 2 wt %, and a Mooney viscosity of 71. The latex of the nitrile copolymer rubber (n3) had a pH of the isoelectric point of 6.7. Further, except for using the obtained nitrile copolymer rubber (n3), the same procedure was followed as in Example 1-1 to prepare compositions. This was similarly evaluated. The results are shown in Table 1.

Comparative Example 1-1

Except for kneading the nitrile copolymer rubber (n1), inorganic filler, and plasticizer as explained below by dry blending when preparing the nitrile copolymer rubber composition, the same procedure was followed as in Example 1-1 to prepare compositions. This was similarly evaluated.

That is, a latex of the nitrile copolymer rubber (n1) obtained in the same way as Example 1-1 was poured into an aqueous solution containing calcium chloride (coagulating agent) of 4 wt % with respect to the solid content (amount of nitrile copolymer rubber) under stirring to make the polymer coagulate. Further, this was filtered and the crumbs were recovered, rinsed, and dried in a vacuum at 60° C. to obtain dried nitrile copolymer rubber (n1). Next, a Bambury mixer was used, an inorganic filler (B) of refined montmorillonite (clay, product name "Kunipia F", made by Kunimine Industries) in 20 parts and a plasticizer (C) of di(butoxyethoxyethyl)adipate in 10 parts were added with respect to 100 parts of the dried nitrile copolymer rubber (n1) and kneaded by dry blending to thereby prepare a nitrile copolymer rubber composition.

Comparative Example 1-2

Except for, in Example 1-2, changing the charged monomers in the first stage reaction to acrylonitrile in 23 parts, and 1,3-butadiene in 70 parts and not using 2-vinyl pyridine, when producing the nitrile copolymer rubber, the same procedure was used as in Example 1-2 for a polymerization reaction to obtain a nitrile copolymer rubber (n4) having acrylonitrile monomer units in 30 wt %, 1,3-butadiene monomer units in 70 wt %, and a Mooney viscosity of 69. The latex of the nitrile copolymer rubber (n4) was one which did not have an isoelectric point. Further, except for using the obtained nitrile copolymer rubber (n4), the same procedure was followed as in Example 1-1 to prepare compositions. This was similarly evaluated. The results are shown in Table 1.

Comparative Example 1-3

In Example 1-1, the charged monomers of the first stage reaction of the emulsion polymerization were changed to acrylonitrile in 85 parts, 1,3-butadiene in 5 parts, and 2-vinyl pyridine in 10 parts when producing a nitrile copolymer rubber and the first stage reaction started. After the start of the reaction, when the polymer conversion rate with respect to the charged monomers reached 15 wt %, 30 wt %, 45 wt %, and 55 wt %, the reaction vessel was additionally charged with 1,3-butadiene/2-vinyl pyridine in 5 parts/5 parts, 5 parts/5 parts, 5 parts/5 parts, and 5 parts/5 parts for 2nd stage, 3rd stage, 4th stage, and 5th stage polymerization reaction. Afterward, when the polymer conversion rate with respect to all monomers charged reached 75 wt %, hydroxylamine sulfate in 0.3 part and potassium hydroxide in 0.2 part were added to make the polymerization reaction stop. After the reaction stopped, the content of the reaction vessel was warmed to 70° C. and the unreacted monomer was recovered by steam distillation under reduced pressure to obtain a latex of the nitrile copolymer rubber (n5) (solids content 24 wt %). The latex of the nitrile copolymer rubber (n5) had a pH of the isoelectric point of 2.4. Further, the nitrile copolymer rubber (n5) had ratios of content of the monomers of acrylonitrile monomer units in 49 wt %, 1,3-butadiene monomer units in 23 wt %, and 2-vinyl pyridine monomer units in 28 wt % and a Mooney viscosity of 93. Further, except for using the obtained nitrile copolymer rubber (n5), the same procedure was followed as in Example 1-1 to prepare compositions. This was similarly evaluated. The results are shown in Table 1.

Comparative Example 1-4

Except for using magnesium silicate having an aspect ratio of 11 (product name: Mistron Vapor, made by Nihon Mistron Co., Ltd.) as the inorganic filler, the same procedure was followed as in Example 1-1 to prepare compositions. These were similarly evaluated. The results are shown in Table 1.

Comparative Example 1-5

Except for not using an inorganic filler, the same procedure was followed as in Example 1-1 to prepare compositions. This was similarly evaluated. The results are shown in Table 1.

Comparative Example 1-6

Except for not using plasticizer, the same procedure was followed as in Example 1-1 to prepare compositions. This was similarly evaluated. The results are shown in Table 1.

Comparative Example 1-7

Except for using alkyl naphthene oil having an SP value by the HOY method of 7.8 $(cal/cm^3)^{1/2}$ ($C_{10}H_7-C_nH_{2n+1}$ (n=16 to 18) (product name: Barrel Process Oil B-28AN, made by Matsumura Oil Co., Ltd.)) as the plasticizer, the same procedure was followed as in Example 1-1 to prepare compositions. This was similarly evaluated. The results are shown in Table 1.

Comparative Example 1-8

Except for using dimethyl phthalate having an SP value by the HOY method of 10.5 $(cal/cm^3)^{1/2}$ (product name: DMF, made by Daihachi Chemical Industry Co., Ltd.) as the plasticizer, the same procedure was followed as in Example 1-1 to prepare compositions. This was similarly evaluated. The results are shown in Table 1.

TABLE 1

| | Example | | | | | | |
|---|---|---|---|---|---|---|---|
| | 1-1 | 1-2 | 1-3 | 1-4 | 1-5 | 1-6 | 1-7 |
| Nitrile copolymer rubber latex | | | | | | | |
| Acrylonitrile units (wt %) | 50 | 30 | 50 | 50 | 50 | 50 | 50 |
| 1,3-butadiene units (wt %) | 48 | 68 | 48 | 48 | 48 | 48 | 48 |
| 2-vinyl pyridine units (wt %) | 2 | 2 | 2 | 2 | 2 | 2 | — |
| N,N-dimethylaminopropylacrylamide (wt %) | — | — | — | — | — | — | 2 |
| Isoelectric point (pH) | 2.6 | 2.7 | 2.6 | 2.6 | 2.6 | 2.6 | 6.7 |
| Aspect ratio of inorganic filler | 300 | 300 | 300 | 300 | 1000 | 50 | 300 |
| Formulation of cross-linkable nitrile copolymer rubber composition | | | | | | | |
| Nitrile copolymer rubber (parts) | 100 | 100 | 100 | 100 | 100 | 100 | 100 |
| Vinyl chloride resin (parts) | — | — | 45 | — | — | — | — |
| Acrylic resin (parts) | — | — | — | 45 | — | — | — |
| Inorganic filler (parts) | 20 | 20 | 20 | 20 | 20 | 20 | 20 |
| Di(butoxyethoxyethyl)adipate (parts) | 10 | 10 | 30 | 30 | 10 | 10 | 10 |
| Alkyl naphthene (parts) | — | — | — | — | — | — | — |
| Dimethyl phthalate (parts) | — | — | — | — | — | — | — |
| Blending method | wet blending | wet blending | wet blending | wet blending | wet blending | wet blending | wet blending |
| Compound Mooney ($ML_{1+4}$, 100° C.) | 103 | 106 | 40 | 38 | 77 | 133 | 100 |
| Tensile strength (MPa) | 23.1 | 20.5 | 19.6 | 18.6 | 15.1 | 24.1 | 23 |
| Elongation (%) | 460 | 430 | 310 | 330 | 500 | 490 | 450 |
| 100% tensile stress (MPa) | 8.3 | 7.2 | 10.9 | 9.4 | 3.6 | 4.8 | 8.1 |
| Hardness (Duro-A) | 79 | 72 | 73 | 72 | 64 | 77 | 78 |
| Gasoline permeation coefficient (g-mm/m²-day) | 250 | 430 | 200 | 260 | 200 | 300 | 255 |
| Embrittlement temperature (° C.) | −10 | −30 | −16 | −17 | −8 | −13 | −10 |
| Sour gasoline resistance (presence of cracks) | None | None | None | None | None | None | None |

| | Comparative Example | | | | | | | |
|---|---|---|---|---|---|---|---|---|
| | 1-1 | 1-2 | 1-3 | 1-4 | 1-5 | 1-6 | 1-7 | 1-8 |
| Nitrile copolymer rubber latex | | | | | | | | |
| Acrylonitrile units (wt %) | 50 | 30 | 49 | 50 | 50 | 50 | 50 | 50 |
| 1,3-butadiene units (wt %) | 48 | 70 | 23 | 48 | 48 | 48 | 48 | 48 |
| 2-vinyl pyridine units (wt %) | 2 | — | 28 | 2 | 2 | 2 | 2 | 2 |
| N,N-dimethylaminopropylacrylamide (wt %) | — | — | — | — | — | — | — | — |
| Isoelectric point (pH) | 2.6 | — | 2.4 | 2.6 | 2.6 | 2.6 | 2.6 | 2.6 |
| Aspect ratio of inorganic filler | 300 | 300 | 300 | 11 | — | 300 | 300 | 300 |
| Formulation of cross-linkable nitrile copolymer rubber composition | | | | | | | | |
| Nitrile copolymer rubber (parts) | 100 | 100 | 100 | 100 | 100 | 100 | 100 | 100 |
| Vinyl chloride resin (parts) | — | — | — | — | — | — | — | — |
| Acrylic resin (parts) | — | — | — | — | — | — | — | — |
| Inorganic filler (parts) | 20 | 20 | 20 | 20 | — | 20 | 20 | 20 |
| Di(butoxyethoxyethyl)adipate (parts) | 10 | 10 | 10 | 10 | 10 | — | — | — |
| Alkyl naphthene (parts) | — | — | — | — | — | — | 10 | — |

TABLE 1-continued

| | | | | | | | | |
|---|---|---|---|---|---|---|---|---|
| Dimethyl phthalate (parts) | — | — | — | — | — | — | — | 10 |
| Blending method | dry blending | wet blending | wet blending | wet blending | — | wet blending | wet blending | wet blending |
| Compound Mooney (ML$_{1+4}$, 100° C.) | 75 | 95 | 145 | 67 | 61 | 93 | 98 | 112 |
| Tensile strength (MPa) | 11.1 | 19.8 | 25.1 | 16.8 | 10.6 | 22.7 | 22.5 | 23.8 |
| Elongation (%) | 520 | 470 | 80 | 520 | 530 | 450 | 480 | 470 |
| 100% tensile stress (MPa) | 3.3 | 4.5 | — | 4.1 | 1.1 | 12.5 | 8.1 | 8.7 |
| Hardness (Duro-A) | 60 | 69 | 98 | 66 | 56 | 86 | 78 | 82 |
| Gasoline permeation coefficient (g-mm/m$^2$-day) | 350 | 550 | 160 | 500 | 520 | 220 | 720 | 300 |
| Embrittlement temperature (° C.) | −7 | −31 | +28 | −7 | −12 | +3 | −8 | +1 |
| Sour gasoline resistance (presence of cracks) | None | None | None | Yes | Yes | None | None | None |

From Table 1, the rubber cross-linked product obtained by coagulating a nitrile copolymer latex composition satisfying the requirements of the present invention, adding a cross-linking agent and cross-linking can be made having excellent normal physical properties, a small gasoline permeation coefficient, a low embrittlement temperature, and superior sour gasoline resistance (Examples 1-1 to 1-7).

On the other hand, when kneading the nitrile copolymer rubber (A), inorganic filler (B), and plasticizer (C) by dry blending, the result becomes inferior in gasoline permeability and high in embrittlement temperature (Comparative Example 1-1).

Further, when not containing cationic monomer units and/or monomer units able to form cations in the nitrile copolymer rubber, the result becomes inferior in gasoline permeability, while when the content of the cationic monomer units and/or monomer units able to form cations is too high, the embrittlement temperature becomes higher (Comparative Examples 1-2 and 1-3).

Further, when using an inorganic filler having an aspect ratio which is too small and when not containing an inorganic filler, the gasoline permeability becomes larger. Further, when not containing a plasticizer, the embrittlement temperature becomes higher as a result (Comparative Example 1-4, 1-5, and 1-6).

Furthermore, when using a plasticizer having an SP value which is too small, the gasoline permeability becomes large, while when the SP value is too large, the embrittlement temperature becomes higher (Comparative Examples 1-7 and 1-8).

Next, Examples 2-1 to 2-10 according to the second embodiment of the present invention (second aspect of the present invention) will be explained.

Example 2-1

Preparation of Nitrile Copolymer Latex Composition and Nitrile Copolymer Rubber Composition An inorganic filler (B) of refined montmorillonite (product name "Kunipia F", made by Kunimine Industries) in 100 parts was added to distilled water in 1995 parts in the presence of sodium polyacrylate in 5 parts and strongly stirred to obtain an aqueous dispersion of an inorganic filler of a solid content concentration of 5% and a pH of 10. Further, a coupling agent (D) of β-(3,4-epoxycyclohexyl)ethyltrimethoxysilane (molecular weight 246.4) in a 50 wt % aqueous emulsion was prepared by mixing with strong stirring. Further, similarly, a plasticizer (C) of di(butoxyethoxyethyl)adipate (product name "Adekasizer RS-107", made by Adeka Corporation, plasticizer) in a 50 wt % aqueous emulsion was prepared by mixing with strongly stirring using potassium oleate as an emulsifier in an amount of 2 wt % of the plasticizer.

Further, while stirring the nitrile copolymer rubber (n1) latex obtained at Example 1-1 in the vessel, the above prepared inorganic filler aqueous dispersion was added and dispersed. Note that, the inorganic filler aqueous dispersion was added to give inorganic filler in 20 parts with respect to the solids content of the latex of the nitrile copolymer rubber (n1) (amount of nitrile copolymer rubber) as 100 parts and thereby give a solid content (nitrile copolymer rubber and inorganic filler) concentration of 15%.

Next, to the solution of the nitrile copolymer rubber (n1) in which the inorganic filler was dispersed, the above prepared emulsion containing coupling agent in 4 parts (amount of coupling agent of 2 parts) and the above prepared emulsion containing di(butoxyethoxyethyl)adipate in 20 parts (amount of plasticizer of 10 parts) was added and mixed and dispersed with respect to the nitrile copolymer rubber (n1) as 100 parts to obtain a nitrile copolymer latex composition. Further, the obtained nitrile copolymer latex composition was poured into the aqueous solution containing calcium chloride (coagulating agent) of 4 wt % with respect to the amount of nitrile copolymer rubber (n1) in the latex composition under stirring while suitably adding 10% dilute sulfuric acid to adjust the pH so that the pH of the aqueous solution during coagulation became a pH 2 of the isoelectric point or less to thereby form crumbs comprised of a mixture of the nitrile copolymer rubber (n1), inorganic filler, coupling agent, and plasticizer.

Further, the obtained crumbs were filtered, rinsed, then dried at 60° C. in a vacuum to obtain a nitrile copolymer rubber composition. Note that, the clay (refined montmorillonite) was measured for aspect ratio by an atomic force microscope. The result was 300.

Preparation of Cross-linkable Nitrile Copolymer Rubber Composition

Next, except for using the obtained nitrile copolymer rubber composition obtained above, the same procedure was followed as in Example 1-1 to prepare a cross-linkable nitrile copolymer rubber composition. A rubber cross-linked product obtained by cross-linking the cross-linkable nitrile copolymer rubber obtained above was evaluated by the above methods for the normal physical properties (tensile strength, elongation, 100% tensile stress, and hardness), gasoline permeation coefficient, embrittlement temperature, and sour gasoline resistance. The results are shown in Table 2.

Examples 2-2 to 2-5

Except for using as the coupling agent (D) instead of the β-(3,4-epoxycyclohexyl)ethyltrimethoxysilane, γ-glycidoxypropyltrimethoxysilane (Example 2-2, molecular weight 236.3), γ-aminopropyltriethoxysilane (Example 2-3, molecular weight 221.4), γ-methacryloxypropyltrimethoxysilane (Example 2-4, molecular weight 248.4), and vinyl tris(β-methoxyethoxy)silane (Example 2-5, molecular weight 280.4) respectively, the same procedure was followed as in Example 2-1 to prepare compositions. These were similarly evaluated. The results are shown in Table 2.

Example 2-6

Except for changing the amount of the coupling agent (D) of β-(3,4-epoxycyclohexyl)ethyltrimethoxysilane from 2 parts to 8 parts, the same procedure was followed as in Example 2-1 to prepare compositions. This was similarly evaluated. The results are shown in Table 2.

Example 2-7

Except for using, instead of the latex of the nitrile copolymer rubber (n1), the latex of the nitrile copolymer rubber (n2) obtained by the above Example 1-2, the same procedure was followed as in Example 2-1 to prepare compositions. This was similarly evaluated. The results are shown in Table 2.

Example 2-8

Except for using sodium tetrasilicate mica (synthetic mica, product name "DMA-350", made by Topy Industry) as the inorganic filler, the same procedure was followed as in Example 2-1 to prepare compositions. This was similarly evaluated. Note that, the sodium tetrasilicate mica (synthetic mica) was measured for the aspect ratio by an atomic force microscope. The result was 1,000.

Example 2-9

Except for, in Example 2-1, further adding to the nitrile copolymer rubber (n1) as 100 parts, a latex of vinyl chloride resin obtained by emulsion polymerization in 150 parts (vinyl chloride resin content of 45 parts) and making the amount of the plasticizer 30 parts when preparing the cross-linkable nitrile copolymer rubber composition, the same procedure was followed as in Example 2-1 to prepare the nitrile copolymer rubber composition. The obtained nitrile copolymer rubber composition was kneaded by rolls at 170° C. for 5 minutes, then a cross-linkable nitrile copolymer rubber composition was prepared in the same way as in Example 2-1. This was similarly evaluated. The results are shown in Table 2.

Example 2-10

Except for, in Example 2-1, further adding to the nitrile copolymer rubber (n1) as 100 parts, a latex of acryl resin obtained by emulsion polymerization in 150 parts (acryl resin content of 45 parts) and making the amount of the plasticizer 30 parts, the same procedure was followed as in Example 2-1 to prepare compositions. This was similarly evaluated. The results are shown in Table 2.

TABLE 2

| | Example | | | | | | | | | |
|---|---|---|---|---|---|---|---|---|---|---|
| | 2-1 | 2-2 | 2-3 | 2-4 | 2-5 | 2-6 | 2-7 | 2-8 | 2-9 | 2-10 |
| Nitrile copolymer rubber latex | | | | | | | | | | |
| Acrylonitrile units (wt %) | 50 | 50 | 50 | 50 | 50 | 50 | 30 | 50 | 50 | 50 |
| 1,3-butadiene units (wt %) | 48 | 48 | 48 | 48 | 48 | 48 | 68 | 48 | 48 | 48 |
| 2-vinyl pyridine units (wt %) | 2 | 2 | 2 | 2 | 2 | 2 | 2 | 2 | 2 | 2 |
| Isoelectric point (pH) | 2.6 | 2.6 | 2.6 | 2.6 | 2.6 | 2.6 | 2.7 | 2.6 | 2.6 | 2.6 |
| Aspect ratio of inorganic filler | 300 | 300 | 300 | 300 | 300 | 300 | 300 | 1000 | 300 | 300 |
| Formulation of cross-linkable nitrile copolymer rubber composition | | | | | | | | | | |
| Nitrile copolymer rubber (parts) | 100 | 100 | 100 | 100 | 100 | 100 | 100 | 100 | 100 | 100 |
| Vinyl chloride resin (parts) | | | | | | | | | 45 | |
| Acrylic resin (parts) | | | | | | | | | | 45 |
| Inorganic filler (parts) | 20 | 20 | 20 | 20 | 20 | 20 | 20 | 20 | 20 | 20 |
| β-(3,4-epoxycyclohexyl)-ethyltrimethoxysilane (parts) | 2 | | | | | 8 | 2 | 2 | 2 | 2 |
| γ-glycidoxypropyltrimethoxy-silane (parts) | | 2 | | | | | | | | |
| γ-aminopropyltriethoxysilane (parts) | | | 2 | | | | | | | |
| γ-methacryloxypropyltrimeth-oxysilane (parts) | | | | 2 | | | | | | |
| Vinyl tris(β-methoxyethoxy)-silane (parts) | | | | | 2 | | | | | |
| bis(3-triethoxysilylpropyl)-tetrasulfane (parts) | | | | | | | | | | |
| γ-mercaptopropyltrimethoxy-silane (parts) | | | | | | | | | | |
| Plasticizer (parts) | 10 | 10 | 10 | 10 | 10 | 10 | 10 | 10 | 30 | 30 |
| Blending method | wet blending | wet blending | wet blending | wet blending | wet blending | wet blending | wet blending | wet blending | wet blending | wet blending |
| Tensile strength (MPa) | 23.4 | 23.2 | 24.8 | 23.1 | 22.2 | 23.3 | 21.1 | 16.2 | 19.7 | 18.8 |
| Elongation (%) | 490 | 490 | 510 | 480 | 460 | 530 | 470 | 530 | 340 | 370 |
| 100% tensile stress (MPa) | 7.4 | 7.2 | 6.8 | 6.9 | 7.4 | 6.9 | 6.2 | 3.2 | 9.7 | 8.6 |
| Hardness (Duro-A) | 76 | 76 | 74 | 75 | 76 | 76 | 69 | 61 | 70 | 69 |
| Gasoline permeation coefficient (g-mm/m$^2$-day) | 220 | 190 | 220 | 230 | 240 | 170 | 380 | 165 | 160 | 180 |

TABLE 2-continued

| | Example | | | | | | | | | |
|---|---|---|---|---|---|---|---|---|---|---|
| | 2-1 | 2-2 | 2-3 | 2-4 | 2-5 | 2-6 | 2-7 | 2-8 | 2-9 | 2-10 |
| Embrittlement temperature (° C.) | −15 | −17 | −14 | −14 | −15 | −20 | −34 | −16 | −17 | −18 |
| Sour gasoline resistance (presence of cracks) | None | None | None | None | None | None | None | None | None | None |

From Table 2, it can be confirmed that by making the ratios of the monomer units forming the nitrile copolymer rubber the predetermined ranges of the present invention, using an inorganic filler having an aspect ratio of 30 to 2,000, and adding the coupling agent in a predetermined amount, the obtained rubber cross-linked product can be made one with good normal physical properties, small in gasoline permeation coefficient, superior in sour gasoline resistance, and further low in embrittlement temperature (Examples 2-1 to 2-10).

Next, Examples 3-1 to 3-2 according to a third embodiment of the present invention (third aspect of the present invention) will be explained.

Example 3-1

Preparation of Nitrile Copolymer Latex Composition and Nitrile Copolymer Rubber Composition An inorganic filler (B) of refined montmorillonite (product name "Kunipia F", made by Kunimine Industries) in 100 parts was added to distilled water in 1995 parts in the presence of sodium polyacrylate in 5 parts and strongly stirred to obtain an aqueous dispersion of an inorganic filler of a solid content concentration of 5% and a pH of 10. Further, a plasticizer (C) of di(butoxyethoxyethyl)adipate (product name "Adekasizer RS-107", made by Adeka Corporation, plasticizer) in a 50 wt % aqueous emulsion was prepared by mixing with strongly stirring using potassium oleate as an emulsifier in an amount of 2 wt % of the plasticizer.

Further, while stirring the nitrile copolymer rubber (n1) latex obtained at Example 1-1 in the vessel, the above prepared inorganic filler aqueous dispersion was added and dispersed. Note that, the inorganic filler aqueous dispersion was added to give inorganic filler in 20 parts with respect to the solid content of the latex of the solid nitrile copolymer rubber (n1) (amount of nitrile copolymer rubber) as 100 parts and thereby give a solid content (nitrile copolymer rubber and inorganic filler) concentration of 15%.

Next, to the solution of the nitrile copolymer rubber (n1) in which the inorganic filler was dispersed, the above prepared emulsion containing di(butoxyethoxyethyl)adipate in 20 parts (amount of plasticizer of 10 parts) was added and mixed and dispersed with respect to the nitrile copolymer rubber (n1) as 100 parts to obtain a nitrile copolymer latex composition. Further, separate from the above, a coagulating solution was prepared by dissolving, in water, calcium chloride $CaCl_2$ (salt containing bivalent metal ions as a coagulating agent) in an amount of 5 parts by weight with respect to the nitrile copolymer rubber (n1) as 100 parts by weight. Further, the obtained nitrile copolymer latex composition was poured into the coagulating solution prepared above under stirring while suitably adding 10% dilute sulfuric acid to adjust the pH so that the pH of the aqueous solution during coagulation became a pH 5.0 to thereby form crumbs comprised of a mixture of nitrile copolymer rubber (n1), inorganic filler, and plasticizer.

Further, the obtained crumbs were filtered, rinsed, then dried at 60° C. in a vacuum to obtain a nitrile copolymer rubber composition.

Preparation of Cross-Linkable Nitrile Copolymer Rubber Composition

Next, except for using the nitrile copolymer rubber composition obtained above, the same procedure was followed as in Example 1-1 to prepare a cross-linkable nitrile copolymer rubber composition. Further, in accordance with the above method, the obtained cross-linkable nitrile copolymer rubber composition was evaluated for Mooney viscosity (compound Mooney viscosity) and the rubber cross-linked product obtained by cross-linking the composition was evaluated for normal physical properties (tensile strength, elongation, 100% tensile stress, and hardness), gasoline permeation coefficient, embrittlement temperature, and sour gasoline resistance. The results are shown in Table 3.

Example 3-2

Except for using as the coagulating agent, instead of the salt containing bivalent metal ions comprised of calcium chloride $CaCl_2$, a salt of monovalent metal ions comprised of sodium chloride NaCl, and adjusting the coagulating solution to give 80 parts by weight with respect to the nitrile copolymer rubber (n1) as 100 parts by weight, the same procedure was followed as in Example 3-1 to prepare compositions. This was similarly evaluated. The results are shown in Table 3.

TABLE 3

| | Example | |
|---|---|---|
| | 3-1 | 3-2 |
| Nitrile copolymer rubber latex | | |
| Acrylonitrile units (wt %) | 50 | 50 |
| 1,3-butadiene units (wt %) | 48 | 48 |
| 2-vinyl pyridine units (wt %) | 2 | 2 |
| Aspect ratio of inorganic filler | 300 | 300 |
| Formulation of cross-linkable nitrile copolymer rubber composition | | |
| Nitrile copolymer rubber (parts) | 100 | 100 |
| Inorganic filler (parts) | 20 | 20 |
| Coagulation conditions | | |
| Coagulating agent | $CaCl_2$ | NaCl |
| Coagulation pH | 5.0 | 5.0 |
| Plasticizer (parts) | 10.0 | 10.0 |
| Blending method | wet blending | wet blending |
| Compound Mooney ($ML_{1+4}$, 100° C.) | 102 | 102 |
| Tensile strength (MPa) | 22.8 | 22.6 |
| Elongation (%) | 500 | 430 |
| 100% tensile stress (MPa) | 8.2 | 8.4 |
| Hardness (Duro-A) | 84 | 87 |

TABLE 3-continued

|  | Example | |
|---|---|---|
|  | 3-1 | 3-2 |
| Gasoline permeation coefficient (g-mm/m$^2$-day) | 260 | 243 |
| Embrittlement temperature (° C.) | −11 | −12 |
| Sour gasoline resistance (presence of cracks) | None | None |

From Table 3, when making the coagulating agent used when coagulating the nitrile copolymer latex composition to obtain a nitrile copolymer rubber composition a salt containing metal ions whose ionic valency is 1 to 3 and making the pH at the time of coagulation 5.0 or less, the obtained rubber cross-linked product can be made one having good normal physical properties, low embrittlement temperature, superior sour gasoline resistance, and, furthermore, a small gasoline permeation coefficient (Examples 3-1 to 3-2).

The invention claimed is:

1. A nitrile copolymer latex composition containing a latex of a nitrile copolymer rubber (A) having α,β-ethylenically unsaturated nitrile monomer units in 10 to 75 wt %, conjugated diene monomer units in 5 to 89.9 wt %, and cationic monomer units and/or monomer units able to form cations in 0.1 to 20 wt %, an inorganic filler (B) having an aspect ratio of 30 to 2,000, and a coupling agent (D), wherein
    a content of said coupling agent (D) is 0.1 to 20 parts by weight with respect to said nitrile copolymer rubber (A) as 100 parts by weight.

2. The nitrile copolymer latex composition as set forth in claim 1, wherein the composition further contains a plasticizer (C) having an SP value by the HOY method of 8 to 10.2 (cal/cm$^3$)$^{1/2}$.

3. The nitrile copolymer latex composition as set forth in claim 1, wherein the composition further contains, with respect to said nitrile copolymer rubber (A) as 100 parts by weight, 10 to 150 parts by weight of a vinyl chloride-based resin and/or acryl-based resin.

4. A method of producing a nitrile copolymer rubber composition by coagulation of the nitrile copolymer latex composition as set forth in claim 1, wherein
    the coagulation of said nitrile copolymer latex composition is performed by using a coagulating agent comprised of a salt containing metal ions whose ionic valency is 1 to 3 under conditions of pH 5.0 or less.

5. A nitrile copolymer rubber composition obtained by coagulation of the nitrile copolymer latex composition as set forth in claim 1.

6. The nitrile copolymer rubber composition of claim 5 further containing, with respect to the nitrile copolymer rubber (A) in the nitrile copolymer rubber composition as 100 parts by weight, 10 to 150 parts by weight of a vinyl chloride-based resin and/or acryl-based resin.

7. A nitrile copolymer rubber composition obtained by the method as set forth in claim 4.

8. A cross-linkable nitrile copolymer rubber composition comprised of the nitrile copolymer rubber composition as set forth in claim 5 to which a cross-linking agent is added.

9. A rubber cross-linked product obtained by cross-linking the cross-linkable nitrile copolymer rubber composition as set forth in claim 8.

* * * * *